United States Patent
Partin et al.

(10) Patent No.: US 10,769,584 B2
(45) Date of Patent: Sep. 8, 2020

(54) INVENTORY CONTROL SYSTEM AND METHOD

(71) Applicant: THE BOEING COMPANY, Chicago, IL (US)

(72) Inventors: Stefan Partin, Seattle, WA (US); Daniel Volk, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 239 days.

(21) Appl. No.: 16/104,762

(22) Filed: Aug. 17, 2018

(65) Prior Publication Data

US 2020/0057981 A1 Feb. 20, 2020

(51) Int. Cl.
*G06Q 10/08* (2012.01)
*G06F 17/16* (2006.01)
*G06Q 30/02* (2012.01)

(52) U.S. Cl.
CPC .......... *G06Q 10/087* (2013.01); *G06F 17/16* (2013.01); *G06Q 30/0202* (2013.01)

(58) Field of Classification Search
CPC ... G06Q 10/087; G06Q 30/0202; G06F 17/16
See application file for complete search history.

(56) References Cited

U.S. PATENT DOCUMENTS

| | | | | |
|---|---|---|---|---|
| 5,963,919 A | * | 10/1999 | Brinkley | G06Q 10/087 705/22 |
| 6,205,431 B1 | * | 3/2001 | Willemain | G06Q 10/04 705/7.25 |
| 7,725,376 B2 | * | 5/2010 | Mathews | G06Q 10/06 705/35 |
| 8,165,914 B2 | * | 4/2012 | Bachman | G06Q 10/063 705/7.12 |

(Continued)

OTHER PUBLICATIONS

R. Ezekwesili, M. K. Shahzad, A. Baboli and R. Tonadre, "Optimizing Bootstrap method to improve forecasting accuracy in business jet spare parts supply chains," 2018 4th International Conference on Optimization and Applications (ICOA), Mohammedia, 2018, pp. 1-6, doi: 10.1109/ICOA.2018.8370567. (Year: 2018).*

(Continued)

*Primary Examiner* — Ashford S Hayles
(74) *Attorney, Agent, or Firm* — Moore IP Law

(57) ABSTRACT

An inventory control system is configured to perform operations including generating an initial demand matrix and generating a plurality of synthetic demand matrices. The operations also include identifying sparse demand vectors in the synthetic demand matrices, where each sparse demand vector represents synthetic demand that satisfies a sparse demand criteria. The operations also include modifying synthetic demand values based on the sparse demand vectors to generate filtered synthetic demand matrices. The operations include generating estimated demand for a target period for each inventory item based on the filtered synthetic (Continued)

demand matrices and the initial demand matrix and comparing the estimated demand to inventory data to determine whether one or more inventory items should be acquired. The operations include generating and sending a demand signal to cause the one or more inventory items to be acquired.

20 Claims, 12 Drawing Sheets

(56) References Cited

U.S. PATENT DOCUMENTS

| | | | | |
|---|---|---|---|---|
| 8,229,791 | B2 * | 7/2012 | Bradley | G06Q 10/06 705/22 |
| 10,176,437 | B2 * | 1/2019 | Li | G06N 5/022 |
| 2006/0047559 | A1 * | 3/2006 | Jacoby | G06Q 10/06315 705/28 |
| 2007/0124009 | A1 * | 5/2007 | Bradley | G06Q 10/06 700/99 |
| 2007/0299716 | A1 * | 12/2007 | Shorter | G06Q 10/087 705/7.22 |
| 2009/0106078 | A1 * | 4/2009 | Boris | G06Q 30/08 705/7.17 |
| 2011/0082774 | A1 * | 4/2011 | Spearman | G06Q 10/087 705/28 |
| 2013/0166350 | A1 * | 6/2013 | Willemain | G06Q 30/0202 705/7.31 |
| 2015/0161545 | A1 * | 6/2015 | Willemain | G06Q 10/087 705/7.25 |
| 2016/0063419 | A1 * | 3/2016 | Martinez | G06Q 10/06315 705/7.25 |
| 2019/0005591 | A1 * | 1/2019 | Rozenson | G06Q 40/12 |
| 2020/0057981 | A1 * | 2/2020 | Partin | G06Q 30/0202 |

OTHER PUBLICATIONS

N. Pawar and B. Tiple, "Demand Forecasting of Anti-Aircraft Missile Spare Parts Using Neural Network," 2019 3rd International conference on Electronics, Communication and Aerospace Technology (ICECA), Coimbatore, India, 2019, pp. 572-578, doi: 10.1109/ICECA.2019.8821903. (Year: 2019).*

Z. Jiantong and L. Biyu, "Forecasting Intermittent Demand Based on Grey Theory," 2009 Second International Conference on Intelligent Computation Technology and Automation, Changsha, Hunan, 2009, pp. 49-52, doi: 10.1109/ICICTA.2009.249. (Year: 2009).*

Y. Yang, K. Wei, R. Kang and S. Wang, "Multi-Objective Chance Constrained Programming of Spare Parts Based on Uncertainty Theory," in IEEE Access, vol. 6, pp. 50049-50054, 2018, doi: 10.1109/ACCESS.2018.2860252. (Year: 2018).*

Syntetos, Aris et al., Forecasting Intermittent Inventory Demands: Simple Parametric Methods vs. Bootstrapping, <https://www.scribd.com/document/274701472/Forecasting-Intermittent-Demand> retrieved Sep. 5, 2018, 31 pgs.

Willemain, Thomas R. et al., "A new approach to forecasting intermittent demand for service part inventories," International Journal of Forecasting, vol. 20, 2004, pp. 375-387.

Waller, Daniel, "Methods for Intermittent Demand Forecasting," <http://www.lancaster.ac.uk/pg/waller/pdfs/Intermittent_Demand_Forecasting.pdf%20Methods%20forIntermittent%20Demand%20Forecasting> retrieved Aug. 17, 2018, 6 pgs.

* cited by examiner

Demand Matrix ↙ 214

|    | -10 | -9 | -8 | -7 | -6 | -5 | -4 | -3  | -2 | -1 |
|----|-----|----|----|----|----|----|----|-----|----|----|
| $I_1$ | 3   | 0  | 8  | 0  | 0  | 6  | 5  | 0   | 0  | 1  |
| $I_2$ | 0   | 0  | 0  | 50 | 15 | 0  | 0  | 100 | 20 | 0  |

Non-Zeroes Matrix ↙ 702

|    | -10 | -9 | -8 | -7 | -6 | -5 | -4 | -3 | -2 | -1 |
|----|-----|----|----|----|----|----|----|----|----|----|
| $I_1$ | 1 | 0 | 1 | 0 | 0 | 1 | 1 | 0 | 0 | 1 |
| $I_2$ | 0 | 0 | 0 | 1 | 1 | 0 | 0 | 1 | 1 | 0 |

IDX matrix ↙ 704

|    | -10 | -9 | -8 | -7 | -6 | -5 | -4 | -3 | -2 | -1 |
|----|-----|----|----|----|----|----|----|----|----|----|
| $I_1$ | 0 | 1 | 2 | 3 | 4 | 5 | 6 | 7 | 8 | 9 |
| $I_2$ | 0 | 1 | 2 | 3 | 4 | 5 | 6 | 7 | 8 | 9 |

$IDX_{start}$ array (index of first non-zero value in each inventory item vector) ↙ 706

| $I_1$ | 0 |
|-------|---|
| $I_2$ | 3 |

$IDX_{new}$ matrix ↙ 708

|    | -10 | -9 | -8 | -7 | -6 | -5 | -4 | -3 | -2 | -1 |
|----|-----|----|----|----|----|----|----|----|----|----|
| $I_1$ | 0 | 1 | 2 | 3 | 4 | 5 | 6 | 7 | 8 | 9 |
| $I_2$ | 3 | 4 | 5 | 6 | 7 | 8 | 9 | 0 | 1 | 2 |

Shifted Demand Matrix (X) ↙ 218

|    | -10 | -9 | -8 | -7 | -6 | -5 | -4 | -3 | -2 | -1 |
|----|-----|----|----|----|----|----|----|----|----|----|
| $I_1$ | 3  | 0  | 8 | 0 | 0   | 6  | 5 | 0 | 0 | 1 |
| $I_2$ | 50 | 15 | 0 | 0 | 100 | 20 | 0 | 0 | 0 | 0 |

*FIG. 7*

Time Matrix (T) — 802

|    | -10 | -9 | -8 | -7 | -6 | -5 | -4 | -3 | -2 | -1 |
|----|-----|----|----|----|----|----|----|----|----|----|
| $I_1$ | 1 | 2 | 3 | 4 | 5 | 6 | 7 | 8 | 9 | 10 |
| $I_2$ | 1 | 2 | 3 | 4 | 5 | 6 | 7 | 8 | 9 | 10 |

Non-Zeroes Matrix x Time Matrix (T) — 804

|    | -10 | -9 | -8 | -7 | -6 | -5 | -4 | -3 | -2 | -1 |
|----|-----|----|----|----|----|----|----|----|----|----|
| $I_1$ | 1 | 0 | 3 | 0 | 0 | 6 | 7 | 0 | 0 | 10 |
| $I_2$ | 0 | 0 | 0 | 4 | 5 | 0 | 0 | 8 | 9 | 0 |

Running max (BxT) — 806

|    | -10 | -9 | -8 | -7 | -6 | -5 | -4 | -3 | -2 | -1 |
|----|-----|----|----|----|----|----|----|----|----|----|
| $I_1$ | 1 | 1 | 3 | 3 | 3 | 6 | 7 | 7 | 7 | 10 |
| $I_2$ | 0 | 0 | 0 | 4 | 5 | 5 | 5 | 8 | 9 | 9 |

Difference matrix (different of adjacent cells of B x T) — 808

|    | -9 | -8 | -7 | -6 | -5 | -4 | -3 | -2 | -1 |
|----|----|----|----|----|----|----|----|----|----|
| $I_1$ | 0 | 2 | 0 | 0 | 3 | 1 | 0 | 0 | 3 |
| $I_2$ | 0 | 0 | 4 | 1 | 0 | 0 | 3 | 1 | 0 |

Left padded difference matrix — 810

|    | -10 | -9 | -8 | -7 | -6 | -5 | -4 | -3 | -2 | -1 |
|----|-----|----|----|----|----|----|----|----|----|----|
| $I_1$ | 1 | 0 | 2 | 0 | 0 | 3 | 1 | 0 | 0 | 3 |
| $I_2$ | 1 | 0 | 0 | 4 | 1 | 0 | 0 | 3 | 1 | 0 |

Intervals matrix (N) — 222

|    | -10 | -9 | -8 | -7 | -6 | -5 | -4 | -3 | -2 | -1 |
|----|-----|----|----|----|----|----|----|----|----|----|
| $I_1$ | 1 | 1 | 2 | 1 | 1 | 3 | 1 | 1 | 1 | 3 |
| $I_2$ | 1 | 1 | 1 | 4 | 1 | 1 | 1 | 3 | 1 | 1 |

*FIG. 8*

INVENTORY CONTROL SYSTEM AND METHOD

FIELD OF THE DISCLOSURE

The present disclosure is generally related to inventory control, particularly for inventory control of items with highly intermittent demand.

BACKGROUND

Inventory control can be a significant challenge for some manufacturers and distributors. For example, if a company makes or distributes a large number of high cost items, a significant amount of expense can be incurred to manufacture or purchase an inventory of the items. To attempt to limit such expenses, companies use demand forecasting to estimate how many of each item should be on hand. For high demand items, relatively straightforward statistical analysis of historical demand can be used to generate an estimate of future demand. However, historical demand data for items that have very intermittent demand may not provide enough data points for reliable statistical analysis. For some industries, many items are both expensive to manufacture or stock and have highly intermittent demand. To illustrate, some device components rarely need replacement, but are expensive if and when they do. For example, some aircraft components, such as main landing gear struts, rarely need to be replaced; however, these components can be quite expensive. Further, customers of manufacturers or distributors of highly intermittent demand items can be significantly inconvenienced if a needed part is not available. To illustrate, continuing the example above, if an aircraft is not able to operate due to the need for a replacement main landing gear strut, an airline that owns and operates the aircraft can incur significant costs as a result of the aircraft being inoperable.

SUMMARY

In a particular aspect, an inventory control system includes one or more memory devices storing inventory data, inventory control instructions, inventory control parameters, and historical demand data. The historical demand data indicates demand for each of a plurality of inventory items during a plurality of time periods. The inventory control system also includes a processor configured to execute the inventory control instructions. The inventory control instructions, when executed by the processor, cause the processor to perform operations including generating, based on the historical demand data, an initial demand matrix including a plurality of demand value cells. Each demand value cell stores a demand value indicating demand, during a respective time period, for a respective inventory item of the plurality of inventory items. The operations also include generating, based on the historical demand data, a plurality of synthetic demand matrices. Each synthetic demand matrix of the plurality of synthetic demand matrices includes a plurality of synthetic demand values arranged in synthetic demand value cells, and each synthetic demand value is determined by using a randomization process to assign a demand value for a particular inventory item and for a first historical period as a synthetic demand value for the particular inventory item and for a second historical period. The operations further include identifying sparse demand vectors for the synthetic demand matrices. Each sparse demand vector includes values indicating synthetic demand that satisfies a sparse demand criteria of the inventory control parameters. The operations also include modifying the synthetic demand matrices based on the sparse demand vectors to generate a plurality of filtered synthetic demand matrices. The operations further include generating estimated demand for a target period for each inventory item of the plurality of inventory items. The estimated demand is generated based on the filtered synthetic demand matrices and the initial demand matrix. The operations also include performing a comparison of the estimated demand and the inventory data to determine whether one or more inventory items should be acquired, and responsive to determining that one or more inventory items should be acquired, generating and sending a demand signal to cause the one or more inventory items to be acquired.

In another aspect, a computer readable storage device stores instructions that are executable by a processor to cause the processor to perform inventory control operations. The inventory control operations include generating, based on historical demand data, an initial demand matrix including a plurality of demand value cells. Each demand value cell stores a demand value indicating demand, during a respective time period, for a respective inventory item of a plurality of inventory items. The inventory control operations also include generating, based on the historical demand data, a plurality of synthetic demand matrices. Each synthetic demand matrix of the plurality of synthetic demand matrices includes a plurality of synthetic demand values arranged in synthetic demand value cells, and each synthetic demand value is determined by using a randomization process to assign a demand value for a particular inventory item and for a first historical period as a synthetic demand value for the particular inventory item and for a second historical period. The inventory control operations further include identifying sparse demand vectors for the synthetic demand matrices. Each sparse demand vector includes values indicating synthetic demand that satisfies a sparse demand criteria of inventory control parameters. The inventory control operations also include modifying the synthetic demand matrices based on the sparse demand vectors to generate a plurality of filtered synthetic demand matrices. The inventory control operations further include generating estimated demand for a target period for each inventory item of the plurality of inventory items, where the estimated demand is generated based on the filtered synthetic demand matrices and the initial demand matrix. The inventory control operations also include performing a comparison of the estimated demand and inventory data to determine whether one or more inventory items should be acquired, and responsive to determining that one or more inventory items should be acquired, generating and sending a demand signal to cause the one or more inventory items to be acquired.

In yet another aspect, a computer-implemented method of inventory control includes generating, by a processor based on historical demand data, an initial demand matrix including a plurality of demand value cells. Each demand value cell stores a demand value indicating demand, during a respective time period, for a respective inventory item of a plurality of inventory items. The method also includes generating, by the processor based on the historical demand data, a plurality of synthetic demand matrices. Each synthetic demand matrix of the plurality of synthetic demand matrices includes a plurality of synthetic demand values arranged in synthetic demand value cells, and each synthetic demand value is determined by using a randomization process to assign a demand value for a particular inventory item and for a first historical period as a synthetic demand value for the particular inventory item and for a second historical period. The method further includes identifying, by the processor, sparse demand vectors for the synthetic demand matrices. Each sparse demand vector includes values indicating synthetic demand that satisfies a sparse demand criteria of inventory control parameters. The method also includes modifying, by the processor, the synthetic demand matrices based on the sparse demand vectors to generate a plurality of filtered synthetic demand matrices. The method further includes generating, by the processor, estimated demand for a target period for each inventory item of the plurality of inventory items, where the estimated demand is generated based on the filtered synthetic demand matrices and the initial demand matrix. The method also includes performing, by the processor, a comparison of the estimated demand and inventory data to determine whether one or more inventory items should be acquired, and responsive to determining that one or more inventory items should be acquired, generating and sending, by the processor, a demand signal to cause the one or more inventory items to be acquired.

BRIEF DESCRIPTION OF THE DRAWINGS

FIG. 7 is a diagram that illustrates a portion of the method of inventory control of FIG. 2 according to a particular implementation.

FIG. 8 is a diagram that illustrates a portion of the method of inventory control of FIG. 2 according to a particular implementation.

DETAILED DESCRIPTION

Figure 1:
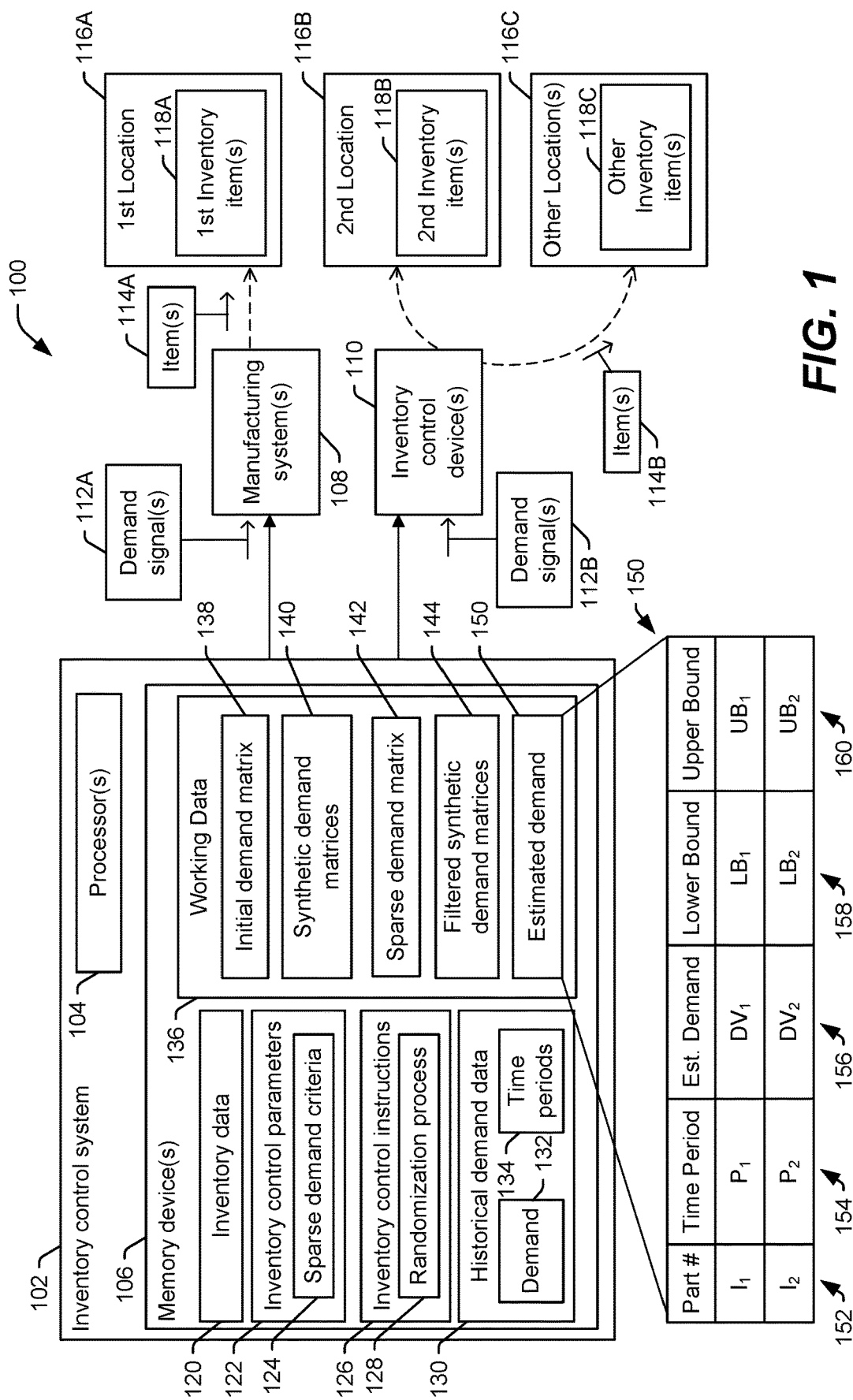
FIG. 1 is a block diagram that illustrates aspects of an example an inventory control system.

Various aspects described herein enable improved inventory control, especially for inventory items that have intermittent demand. In this context, intermittent demand refers to demand that varies significantly from one tracking period to another and includes a significant number of tracking periods (e.g., 30% to 90% of tracking periods) with no demand (i.e., zero demand). Methods and systems described herein are especially useful for manufactures or distributers that need to control an inventory that includes a large number of inventory items with intermittent demand. For example, aircraft manufacturers often supply replacement parts for their aircraft. Large aircraft can include millions of parts, many of which are replaced only infrequently. Maintaining appropriate inventory levels of each of these parts can be challenging. The systems and methods described enable the use of matrix manipulations to batch process large quantities of inventory data in parallel.

Parallel processing of inventory forecasts reduces the time (both personnel time and computing time) required to accurately forecast future demand for a large number of inventory items, which improves resources utilization. For example, consider an distribution system that relies on stocking a large number of items at multiple different geographic locations. In this example, if demand forecasts are generated for each item one-by-one (e.g., sequentially), the demand forecasts for the items are available at different times. This can result in inefficient shipping or delays. To illustrate, a first item that needs to be shipped from a first location to a second location, based on the first item's demand forecast, can be shipped immediately to avoid delays. However, if a second item also needs to be shipped from the first location to the second location based on the second item's demand forecast (which is generated after the first item's demand forecast), the second item will be shipped separately, which can be an inefficient use of shipping resources. Alternatively, the first item can be delayed to determine whether another item (e.g., the second item) also needs to be shipped to the second location; however, this results in an unnecessary delay of the first item, which can result in the first item not being available when and where it is needed.

In contrast, by processing demand forecasts in parallel, the forecasted demand for all of the items is known simultaneously. As a result, the redistribution of groups of items can occur without the need to delay movement of items to generate a batch. Thus, the parallel processing of demand forecasts improves operation of the inventory control system by using shipping resources efficiently while simultaneously ensuring that items are positioned as quickly as possible where the demand forecast indicates they will be needed. Similar rationale applies if the items are to be manufactured rather than, or in addition to, being redistributed.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple locations are illustrated and associated with reference numbers 116A, 116B, and 116C. When referring to a particular one of these locations, such as a first location 116A, a distinguishing letter (e.g., "A") is used. However, when referring to any arbitrary one of these locations or to these locations as a group, the reference number 116 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a value (or a signal) can refer to actively generating, calculating, or determining the value (or the signal) or can refer to using, selecting, or accessing the value (or the signal) that is already generated, such as by another component or device. Additionally, "adjusting" and "modifying" can be used interchangeably. For example, "adjusting" or "modifying" a parameter can refer to changing the parameter from a first value to a second value (a "modified value" or an "adjusted value"). As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram that illustrates aspects of an example of a system 100 that includes an inventory control system 102. In the example illustrated in FIG. 1, the system 100 also includes one or more manufacturing systems 108, one or more inventory control devices 110, and a plurality of locations 116 (including locations 116A, 116B, and 116C). In the example illustrated in FIG. 1, the locations 116 are geographically remote from one another, and each location 116 stores (e.g., maintains an inventory of) a set of inventory items 118. For example, the first location 116A stores first inventory items 118A, the second location 116B stores second inventory items 118B, and the third location 116C stores third inventory items 118C.

The inventory control system 102 includes one or more processors 104 and one or more memory devices 106. The one or more processors 104 are configured to execute instructions in parallel to perform inventory control operations. For example, the one or more processors 104 can include a processor (or multiple processors) with multiple processing cores or a processor (or multiple processors) configured to concurrently execute multiple processing threads. As a specific example, the one or more processors 104 can include a graphics processing unit (GPU) or another processor with a highly parallel architecture. In other examples, the one or more processors 104 include a plurality of distributed processors interconnected via a network or bus architecture to enable parallel processing.

The one or more memory devices 106 store data and instructions used by the inventory control system 102 to perform various operations. For example, the one or more memory devices 106 can store inventory data 120, inventory control instructions 126, inventory control parameters 122, historical demand data 130, working data 136, other data or instructions (e.g., a hypervisor to control parallel processing), or a combination thereof.

The inventory data 120 includes records indicating a number of each inventory item 118 on hand at each location 116. The historical demand data 130 indicates demand 132 for each of a plurality of inventory items during a plurality of time periods 134. In a particular implementation, the historical demand data 130 includes a transaction database including transaction records (e.g., one record per transaction). To illustrate, each transaction record can include data identifying an inventory item (or multiple inventory items), a date/timestamp, a quantity of each inventory item involved in the transaction. In other implementations, the historical demand data 130 includes records of listings of demand per inventory item, such as time series data indicating a quantity of each inventory item sold (i.e., demand) during each time period 134.

The inventory control instructions 126 include an application or other code (e.g., scripts) executable by the one or more processors 104 to perform inventory control operations. For example, as described further below, the inventory control operations can include generating an initial demand matrix 138 based on the historical demand data 130, generating a plurality of synthetic demand matrices 140 based on the historical demand data 130 using a randomization process 128, identifying sparse demand vectors (which together form a sparse demand matrix 142) for the synthetic demand matrices 140 based on sparse demand criteria 124 of the inventory control parameters 122, modifying the synthetic demand matrices 140 based on the sparse demand vectors to generate a plurality of filtered synthetic demand matrices 144, generating estimated demand 150 for a target period for each inventory item based on the filtered synthetic demand matrices 144 and the initial demand matrix 138, comparing the estimated demand 150 and the inventory data 120, and generating and sending one or more demand signals 112 based on the comparison.

In the example illustrated in FIG. 1, the working data 136 includes the initial demand matrix 138, the synthetic demand matrices 140, the sparse demand matrix 142, the filtered synthetic demand matrices 144, and the estimated demand 150. In some implementations, the working data 136 also includes other data, such as various matrices and vectors described below that reduce processing resources required to use matrices to estimate demand for a large number of inventory items in parallel. In some implementations, the working data 136 is stored in the memory devices 106 temporarily (e.g., is purged after the estimated demand 150 is determined). In other implementations, portions of or all of the working data 136 moved to a persistent memory location, e.g., a database that includes estimated demand records, after the estimated demand 150 is determined.

In the example illustrated in FIG. 1, the estimated demand 150 includes information 152 identifying a plurality of inventory items (e.g., $I_1$ and $I_2$), information identifying a time period 154 for each inventory item (e.g., $P_1$ and $P_2$), an estimated demand value 156 for each inventory item (e.g., $DV_1$ and $DV_2$), and an estimated demand range for each inventory item. In FIG. 1, the estimated demand range for each inventory item is represented by a lower bound 158 (e.g., $LB_1$ and $LB_2$) and an upper bound 160 (e.g., $UB_1$ and $UB_2$). The estimated demand 150 in FIG. 1 is shown with only two data records (corresponding to two inventory items $I_1$ and $I_2$) merely to illustrate features of the data records and for ease of illustration. Generally, the estimated demand 150 will include more than two data records (corresponding to more than two inventory items). The number of data records in the estimated demand 150 is limited only by the number of inventory items for which demand forecasts are needed and practical limitations associated with the inventory control system, such as available processing and/or memory resources. Examples of a process for generating the estimated demand 150 based on the historical demand data 130 are described in detail with reference to FIGS. 2-10.

After the inventory control system 102 generates the estimated demand 150, the estimated demand 150 is compared to the inventory data 120 to determine whether one or more inventory items should be acquired at a particular location 116. For example, the inventory data 120 for an item 114A may indicate that three instances of item 114A are on-hand at the first location 116A. In this example, if the estimated demand 150 indicates that in the next time period (e.g., $P_1$), there is projected to be demand for four instances of item 114A at the first location 116A, the inventory control system 102 determines that another (e.g., one more) instance of item 114A should be acquired at the first location 116A. However, if in this example, the estimated demand 150 indicates that in the next time period (e.g., $P_1$), there is projected to be demand for two instances of item 114A at the first location 116A, the inventory control system 102 determines that no additional instances of item 114A should be acquired at the first location 116A. Further, in this circumstance, the inventory control system 102 can determine that one of the instances of the item 114A at the first location 116A could be moved to another location 116 (e.g., the second location 116B) if needed.

In some implementations, the inventory data 120 is also, or in the alternative, compared to the estimated demand range to determine whether an item should be acquired. For example, the estimated demand value for a particular inventory item can be determined based on an average expected demand, as described further below. Using the average expected demand may be appropriate for most inventory items. However, some inventory items may be too important to risk not having items on hand if above average demand occurs. For example, a business can be obliged to keep certain items in stock based on contract terms or regulatory requirements. For such items, the inventory data 120 can be compared to the upper bound 160 to determine whether a number of the items on hand at a particular location 116 is at least enough to satisfy the upper bound 160. Conversely, some inventory items may be too expensive or fragile or have too a short useful lifespan to risk having more items on hand than needed. For such items, the inventory data 120 can be compared to the lower bound 158 to determine whether a number of the items on hand at a particular location 116 is at least enough to satisfy the lower bound 158.

When the inventory control system 102 determines that an inventory item 114 should be acquired at a location 116, the inventory control system 102 generates and sends one or more demand signals 112. The demand signal(s) 112 can be sent to manufacturing systems 108, to inventory control devices 110, or both. The manufacturing systems 108 can be automated, semi-automated, or computer assisted. For example, in some implementations, the manufacturing systems 108 can include one or more fully automated manufacturing machines configured to manufacture a particular item (e.g., the item 114A) in response to the demand signal 112A. The fully automated manufacturing machines can include any of a variety of computer-controlled manufacturing devices, such as 3D printers, laser sintering devices, laser cutters, computer numerical control (CNC) fabrication machines, printers, pick-and-place machines, robotic welders, manufacturing robots, other computer controlled devices, or combinations thereof. In other implementations, the manufacturing systems 108 can include semi-automated machines, such as machines that automatically perform manufacturing operations on raw materials loaded by an operator. In yet other implementations, the manufacturing systems 108 can include computer-assisted systems in which one or more operators perform or facilitate some process steps under the direction of or assisted by a computing device that received the demand signal 112A.

In some implementations, at least some of the manufacturing systems 108 are distributed at the one or more of the locations 116. For example, the inventory control system 102 can send the demand signal 112A indicating that one or more instances of the items 114A are needed at the first location 116A to a manufacturing system 108 that is at the first location 116A. In this example, when the manufacturing system 108 finishes producing the items 114A, the items 114A are immediately available at the first location 116A. Likewise, if the inventory control system 102 determines that another item is needed at the second location 116B, the inventory control system 102 can send a demand signal 112 for the other item to a manufacturing system 108 at the second location 116B. In other implementations, at least some of the manufacturing systems 108 are remote from the one or more of the locations 116. In such implementations, the manufacturing systems 108 can rely on the inventory control devices 110 to enable transportation of manufactured items to the locations 116.

The inventory control devices 110 can be automated, semi-automated, or computer assisted. For example, in some implementations, the inventory control devices 110 can include one or more fully automated shipping or redistribution devices configured to, responsive to the demand signal 112B, move a particular item (e.g., the item 114B) between two locations 116 or to a particular location 116 from a manufacturing system 108. The fully automated shipping or redistribution devices can include any of a variety of computer-controlled transportation devices, such as unmanned aircraft, watercraft, or ground vehicles. The fully automated shipping or redistribution devices can include automated material handling devices, such as inventory management robots, robotic loaders and unloaders, etc. In other implementations, the inventory control devices 110 can include semi-automated shipping or redistribution devices, such as machines that automatically palletize items for transport via a conventional (e.g., manned) shipping vehicle. In yet other implementations, the inventory control devices 110 can include computer-assisted systems in which one or more operators perform or facilitate some transport steps under the direction of or assisted by a computing device that received the demand signal 112B.

Thus, the system 100 enables estimating demand for a large number of inventory items with highly intermittent demand in a resource efficient manner. The system 100 also improves and, in some implementations, automates acquiring inventory items at particular locations based on the estimated demand.

Figure 2:
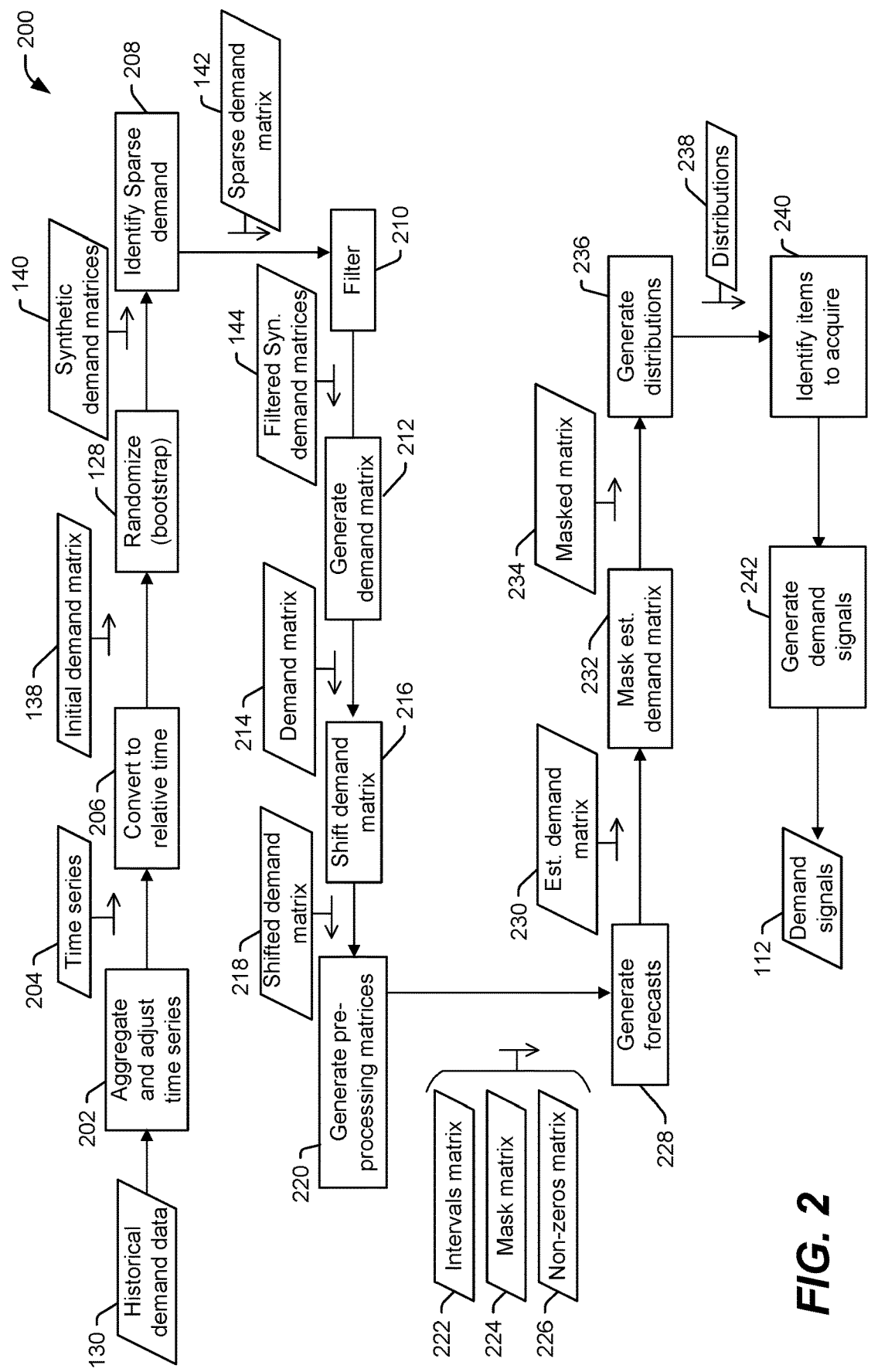
FIG. 2 is a diagram that illustrates aspects of a method of inventory control.

FIG. 2 is a diagram that illustrates aspects of a method 200 of inventory control. The method 200 includes, at 202, accessing historical demand data 130 that identifies a plurality of historical transactions and generating time series 204 based on the historical demand data 130. In the example illustrated in FIG. 2, the time series 204 are generated by aggregating demand from the plurality of historical transactions by inventory item and historical period. In some implementations, aggregate demand for some inventory items can also be adjusted, e.g., to account for seasonal fluctuations. The method 200 also includes generating the initial demand matrix 138 based on the time series 204. The initial demand matrix 138 includes a plurality of demand value cells, and each demand value cell stores a demand value indicating demand, during a respective time period, for a respective inventory item of the plurality of inventory items. Generating the initial demand matrix 138 based on the time series 204 includes, at 206, converting the time series to relative time, as explained further below.

For ease of description herein, the initial demand matrix 138 is described as having rows corresponding to inventory items (e.g., each row includes demand values for a corresponding inventory item) and columns representing time periods. Thus, one row includes demand values for multiple time periods for a single inventory item, and one column includes demand values for multiple inventory items during a single tracking period. In this example, the initial demand matrix is an I×P matrix, where I is the number of inventory items tracked, and P is the number of tracking periods. This description of the initial demand matrix 138, and corresponding descriptions of other matrices herein, is merely to facilitate description and is not limiting. In other implementations, other arrangements of rows and columns, or other data structures could be used.

The method 200 also includes using the randomization process 128 to generate a plurality of synthetic demand matrices 140. Each synthetic demand matrix 140 of the plurality of synthetic demand matrices 140 includes a plurality of synthetic demand values arranged in synthetic demand value cells. The randomization process 128 can also be referred to as bootstrapping. In the randomization process 128, each synthetic demand value is determined by randomly (or pseudo randomly) assigning a demand value (of the initial demand matrix 138) for a particular inventory item and for a first historical period as a synthetic demand value for the particular inventory item and for a second historical period. Put another way, each synthetic demand value is an actual historical demand value for the same inventory item, but the historical demand values are shuffled and reused among the synthetic demand values for the inventory item. Each synthetic demand matrix 140 is an I×P matrix, and a number, N, of the synthetic demand matrices 140 are generated using the randomization process 128.

The method 200 includes, at 208, identifying inventory items with sparse demand in the synthetic demand matrices 140 and generating the sparse demand matrix 142. An inventory item has sparse demand in a particular synthetic demand matrix 140 if the inventory item vector (e.g., row) corresponding to the inventory item in the particular synthetic demand matrix 140 satisfies the sparse demand criteria 124 (e.g., has less than a threshold amount of demand). For example, due to the randomization process 128, it is possible for a particular synthetic demand matrix 140 to have no demand (i.e., a demand value of zero for each tracked period) for a particular inventory item. Such a zero-demand inventory item vector provides little or no useful information and can therefore be ignored in subsequent calculations. Even an inventory item vector indicating very low demand (e.g., less than a threshold) for the inventory item provides little information and can be ignored in some implementations.

The sparse demand matrix 142 identifies inventory item vectors of the synthetic demand matrices 140 that have sparse demand (i.e., that satisfy the sparse demand criteria 124). The sparse demand matrix 142 is an I×N matrix. As a specific example, the sparse demand matrix 142 can include sparse demand values arranged in rows and columns, with one row for each tracked inventory item (e.g., I rows) and one column for each synthetic demand matrix 140 (e.g., N columns). If a particular inventory item in a particular synthetic demand matrix 140 satisfies the sparse demand criteria 124 (e.g., has less than threshold demand), the sparse demand matrix 142 includes a value of zero (0) for the particular inventory item of the particular synthetic demand matrix 140. However, if the particular inventory item in the particular synthetic demand matrix 140 does not satisfy the sparse demand criteria 124 (e.g., has at least threshold demand), the sparse demand matrix 142 includes a value of one (1) for the particular inventory item of the particular synthetic demand matrix 140. Thus, the sparse demand matrix 142 is similar to a Boolean matrix, except that in the sparse demand matrix 142, each sparse demand value is a numerical value rather than a logical value.

In some implementations, the sparse demand criteria 124 include a demand threshold and a count threshold. The demand threshold indicates a minimum demand value magnitude (e.g., amount of demand) for an particular period that will be counted, and the count threshold indicates a minimum total count for all periods. For example, to determine a value in the sparse demand matrix 142 for a particular inventory item and a particular synthetic demand matrix 140, a count is incremented for each demand value for the particular inventory item in the synthetic demand matrix 140 that is greater than (or greater than or equal to) the demand threshold. After each demand value for the particular inventory item has been checked, the count is compared to the count threshold. If the count is less than (or less than or equal to) the count threshold, a value of zero (0) is stored in the sparse demand matrix 142 for the particular inventory item of the particular synthetic demand matrix 140. If the count is greater than (or greater than or equal to) the count threshold, a value of one (1) is stored in the sparse demand matrix 142 for the particular inventory item of the particular synthetic demand matrix 140.

The method 200 also includes, at 210, filtering the synthetic demand matrices 140 based on the sparse demand matrix 142 to generate the filtered synthetic demand matrices 144. In a particular implementation, the synthetic demand matrices 140 are filtered by dividing the synthetic demand matrices 140 by the sparse demand matrix 142. Division of an inventory item vector of a particular synthetic demand matrix 140 by a value of 1 in the sparse demand matrix 142 in effect copies the inventory item vector, unchanged, to a corresponding filtered synthetic demand matrix 144. However, division of an inventory item vector of a particular synthetic demand matrix 140 by a value of 0 results in an undefined result, which the processors 104 recognize as a not-a-number (NaN) result. Thus, each synthetic demand value of the inventory item vector in the corresponding filtered synthetic demand matrix 144 is undefined or not a number. As a result, the inventory item vector is present in the filtered synthetic demand matrix 144 but is ignored in subsequent calculations.

After the filtered synthetic demand matrices 144 are generated, the method 200 includes, at 212, generating a demand matrix 214. The demand matrix 214 is formed by joining the filtered synthetic demand matrices 144 and the initial demand matrix 138. The demand matrix 214 can be thought of as a three-dimensional matrix with multiple two dimensional arrays. For example, the demand matrix 214 includes one two-dimensional array for each filtered synthetic demand matrix 144 and a two-dimensional array for the initial demand matrix 138. Thus, the demand matrix 214 is an I×P×(N+1) matrix. N+1 represents the total number of arrays (or samples) in the demand matrix 214. For ease of reference, the total number of samples is also referred to herein as S, where S is equal to N+1.

The method 200 also includes, at 216, shifting one or more inventory item vectors of one or more arrays of the demand matrix 214 to generate the shifted demand matrix 218. The shifting is performed such that, in a shifted demand matrix 218, no inventory item vector starts with a zero demand value (e.g., so that the demand value cell associated with the oldest tracking period for each inventory item is non-zero). In a particular implementation, the oldest tracking period corresponds to a left most column of each array. In this implementation, shifting the demand matrix 214, at 216, can be conceptually described as, for each inventory item vector, moving zero demand values from the left end of the inventory item vector and adding padding values (which are zero values) to the right end of the inventory item vector until the left most demand value is non-zero. While this conceptual description illustrates the result of the shifting, in a particular implementation as described with reference to FIG. 7, the entire demand matrix 214 is shifted simultaneously by re-indexing or re-arranging the arrays of the demand matrix 214.

The method 200 also includes, at 220, generating a set of pre-processing matrices based on the demand matrix 214, the shifted demand matrix 218, or both. In a particular implementation, the pre-processing matrices include an intervals matrix 222, a mask matrix 224, and a non-zeroes matrix 226. Each of the intervals matrix 222, the mask matrix 224, and the non-zeroes matrix 226 includes one array for each array of the shifted demand matrix 218. Thus, each of the intervals matrix 222, the mask matrix 224, and the non-zeroes matrix 226 is an I×P×S matrix.

The intervals matrix 222 indicates, for each demand value cell of the shifted demand matrix 218, how many intervals (e.g., periods) have occurred since the most recent non-zero demand value. Thus, the intervals matrix 222 provides an indication or how frequently each inventory item has any non-zero demand in each array of the shifted demand matrix 218.

The non-zeroes matrix 226 includes a value of one (1) in each cell corresponding to a demand value cell of the shifted demand matrix 218 that has a non-zero value and has a value of zero (0) in each cell corresponding to a demand value cell that has a zero (0) value. Thus, the non-zeroes matrix 226 is similar to a Boolean matrix, except that in the non-zeroes matrix 226 uses numerical values rather than logical values.

The mask matrix 224 identifies padding values of the shifted demand matrix 218 that are added, relative to the demand matrix 214, due to shifting the demand matrix 214 at 216. Thus, using the conceptual example from the discussion of shifting the demand matrix 214 above, the mask matrix 224 identifies zero values added as padding to the right end of each inventory item vector during, or as a consequence of, shifting the demand matrix 214.

The method 200 further includes, at 228, generating forecasts to form an estimated demand matrix 230. The estimated demand matrix 230 is an I×P×S matrix that includes an estimated demand value for each tracked time period (including the target time period) and each inventory item. Determination of the estimated demand matrix 230 is described further with reference to FIG. 9. The estimated demand matrix 230 includes or is used to determine at least a portion of the estimated demand 150. For example, the estimated demand matrix 230 can be used to determine the upper bound 158, the lower bound 160, or both.

In the example illustrated in FIG. 2, the method 200 also includes, at 232, using the mask matrix 224 to mask the estimated demand matrix 230 to generate a masked matrix 234. The masked matrix 234 is identical to the estimated demand matrix 230 except that estimated demand values of the estimated demand matrix 230 that correspond to padding values identified in the mask matrix 224 are omitted or masked out of the masked matrix 234. For example, if a zero was added to a particular demand value cell of the demand matrix 214 to form the shifted demand matrix 218, the location at which the zero was added is indicated in the mask matrix 224, and applying the mask matrix 224 to the estimated demand matrix 230 causes the estimated demand value cell corresponding to the particular demand value cell to which the zero was added to be omitted from consideration or masked in the masked matrix 234.

The method 200 also includes, at 236, generating distributions 238 based on the masked matrix 234. The distributions 238 include one distribution per tracked inventory item (e.g., I distributions). The distribution 238 for a particular inventory item indicates the statistical distributions of demand values in the estimated demand matrix 230 for the particular inventory item. Note that the initial demand matrix 138 included P demand values for each inventory item. However, due to the randomization process 128 and omission of sparse demand vectors, the estimated demand matrix 230 includes many more demand values, and thus enables more robust statistical analysis. To illustrate, for a particular inventory item, assuming that no vector corresponding to the inventory item in the synthetic demand matrices 140 satisfied the sparse demand criteria 124 and assuming that no estimated demand value is masked based on the mask matrix 224, the distribution 238 for the particular inventory item is based on P×S estimated demand values.

The distributions 238 are used to determine a range of estimated demand values for each inventory item. For example, each range can include an upper bound 160 and a lower bound 158. The upper bound 160 and lower bound 158 can be determined using statistical processes based on criteria in the inventory control parameters 122. For example, an upper bound 160 for a particular inventory item may be determined based on a quantile of the estimated demand values for the particular inventory item. To illustrate, the upper bound 160 can be set at the 95% quantile of the estimated demand values. In other implementations, other analyses can be used to set the upper bound 160, such as multiple of the standard deviation of the distribution 238 for the inventory item. Similar analyses can be used to determine the lower bound 158. To illustrate, the lower bound 158 can be set at the 15% quantile. In some implementations, the threshold or function used to set the bounds for one inventory item can be different from the threshold or function used to set the bounds for another inventory item. To illustrate, based on the inventory control parameters 122, the lower bound 158 for a first inventory item can be the 15% quantile, whereas the lower bound 158 for another inventory item can be set at the 10% quantile.

At 240, the estimated demand values for a target period (from the estimated demand matrix 230), the distributions 238, or both, are compared to the inventory data 120 to determine whether one or more items should be acquired. If a particular inventory item is to be acquired, the method 200 includes, at 242, generating the demand signals 112.

Figure 3:
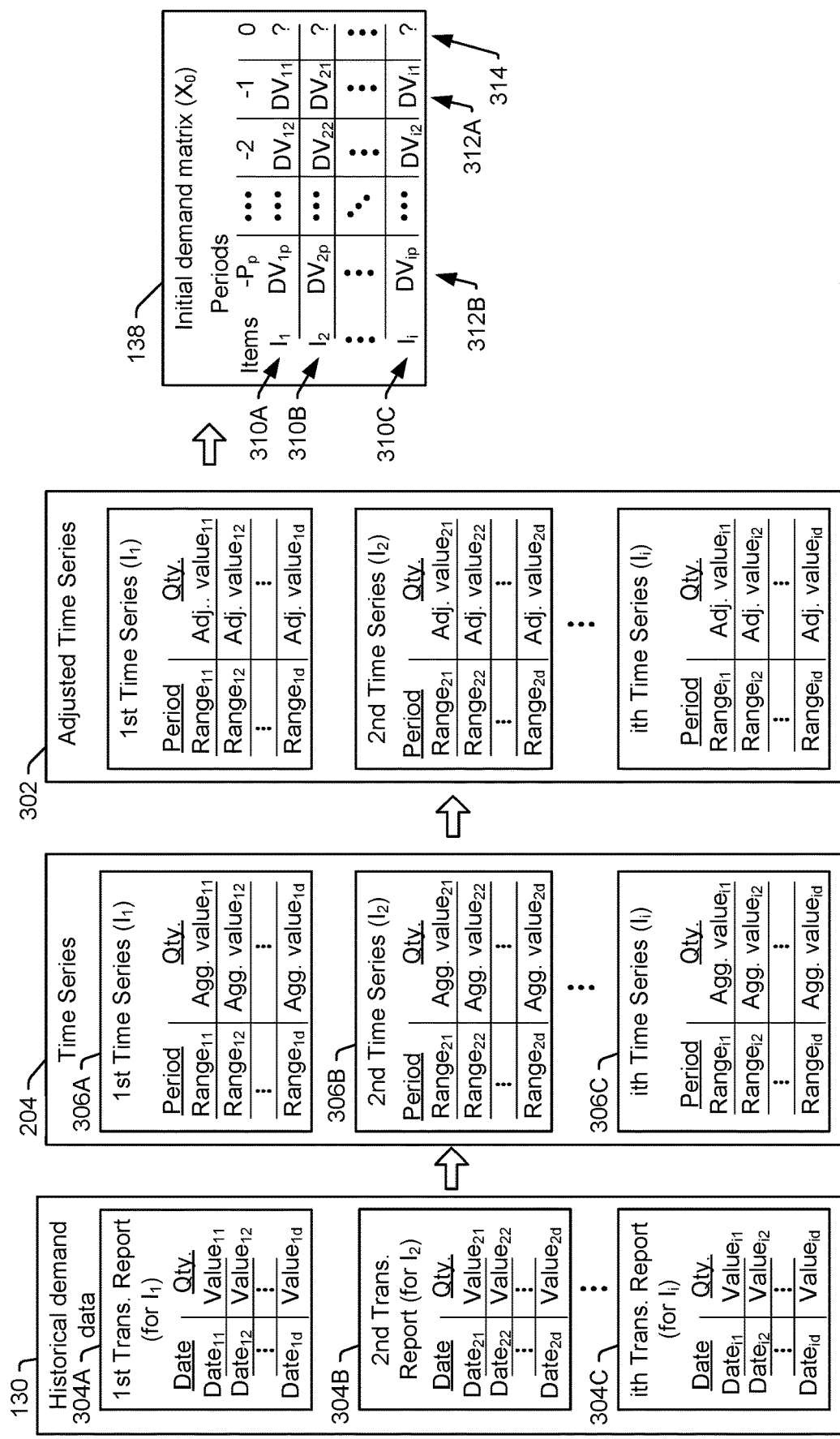
FIG. 3 is a diagram that illustrates a portion of the method of inventory control of FIG. 2 according to a particular implementation.

FIG. 3 gives an example of generating the time series 204 based on the historical demand data 130 according to one implementation. In FIG. 3, the historical demand data 130 is illustrated as including a first transaction report 304A for a first item ($I_1$), a second transaction report 304B for a second item ($I_2$), and an ith transaction report 304C for an ith item ($I_i$). Each transaction report 304 lists transactions by the date of the transaction and the quantity of each item sold. The transaction reports 304 illustrated in FIG. 3 are simplified examples. In other implementations, a transaction report 304 can include additional data related to each transaction.

In FIG. 3, the time series 204 are generated by aggregating, for each item, the quantities for transactions that occurred within a date range (e.g., a day, a week, a month, etc.). To illustrate, if each date range includes one month, the transactions that occurred during a particular month are summed to generated an aggregate value for the particular month for the particular inventory item. Thus, a first aggregate value (Agg. value$_{11}$) in a first time series 306A in the example illustrated in FIG. 3 is the sum of the quantities from all transactions in the first transaction report 304A that occurred on dates (e.g., Date$_{11}$) that are within a particular date range (e.g., Range$_{11}$). In the time series 204, the periods are evenly spaced; however, different date ranges can be used for different inventory items. For example, the date range for the first time series 306A may be one month, whereas a second times series 306B may use a date range corresponding to a week, and a third time series 306C may use a date range corresponding to a quarter of a year.

It is possible that some items have no transactions during a particular date range. The aggregate value for such items is zero in date ranges in which there are no transactions. Alternatively, the aggregate value can be NULL, in which case NULL values can be replaced with zero values when the initial demand matrix 138 is generated.

Some inventory items may experience unusual demand during particular date ranges, such as extra demand due to a one-time event or a seasonal/periodic event. In some implementations, when such unusual demand can be identified, the time series 204 can be adjusted to remove the effects of unusual demand to generate adjusted time series 302.

The time series 204 or the adjusted time series 302 are used to form the initial demand matrix 138. As a simple example, each time series (e.g., the first time series 306A for item $I_1$) is arranged as a vector of demand value cells. In this example, each demand value cell includes the aggregate or adjusted value (e.g., Agg. Value$_{11}$ or Adj. value$_{11}$) for a particular date range. As described above, in some implementations, different date ranges can be used for the different time series 306A-306C. In the initial demand matrix 138, the various date ranges are converted to relative time. For example, each date range, regardless of duration, is considered a tracking period (generally referred to herein, as simply a period). To illustrate, if demand for the first inventory item is aggregated weekly and demand for the second inventory item is aggregated monthly, each demand value cell in the initial demand matrix 138 for the first inventory item will indicate demand during one week, and each demand value cell in the initial demand matrix 138 for the second row 310B will indicate demand during one month.

In example of FIG. 3, the initial demand matrix 138 includes a plurality of demand value (DV) cells arranged in rows and columns. Each row corresponds to an inventory item. Thus, a first row 310A includes demand values for a first inventory item ($I_1$), a second row 310B includes demand values for a second inventory item ($I_2$), and a third row 310C includes demand values for an ith inventory item ($I_i$). Each column in this example corresponds to a tracking period and the columns are arranged from oldest toward the left to newest toward the right. Thus, a first column 312A (Index −1) includes the newest historical demand values and a second column 312B (Index −$P_p$) includes the oldest historical demand values. In the example illustrated in FIG. 3, the initial demand matrix also includes a column 314 for a target period (Index 0) corresponding to a future period for which estimated demand is to be determined. For convenience in FIG. 3, the target period is assigned Index 0 and each other tracking period is assigned a negative index value indicating how many tracking periods removed it is from the target period.

Figure 4:
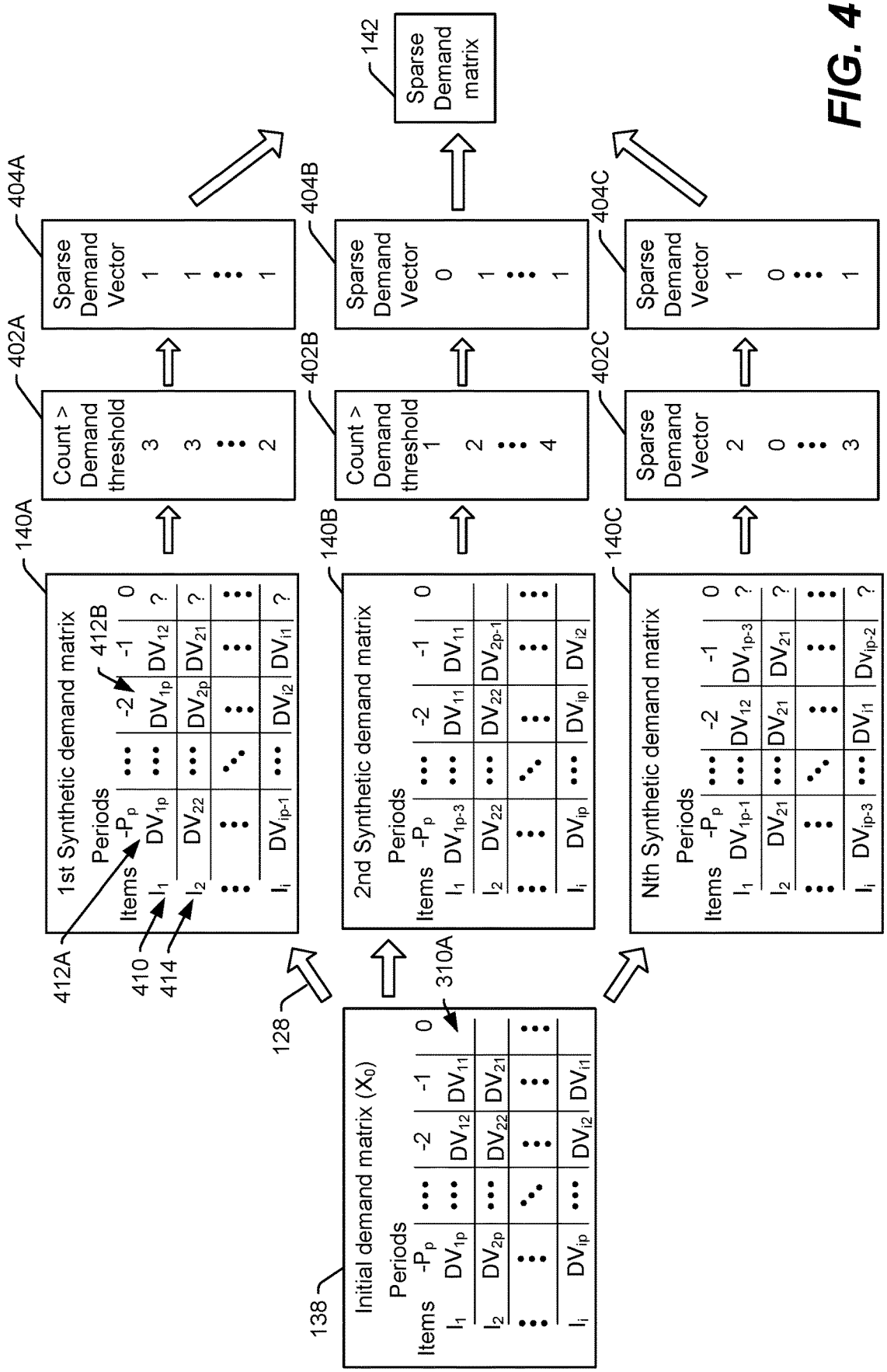
FIG. 4 is a diagram that illustrates a portion of the method of inventory control of FIG. 2 according to a particular implementation.

FIG. 4 illustrates an example of forming the synthetic demand matrices 140 based on the initial demand matrix 138. The synthetic demand matrices 140 are formed using the randomization process 128. Each of the synthetic demand matrices 140 includes a plurality of synthetic demand values arranged in synthetic demand value cells. Each synthetic demand value is determined by using the randomization process 128 to assign a demand value for a particular inventory item and for a first historical period as a synthetic demand value for the particular inventory item and for a second historical period.

For example, in the randomization process 128, a synthetic demand value for a first synthetic demand value cell 412A in a first row 410 of a first synthetic demand matrix 140A is assigned by randomly (or pseudo randomly) selecting a demand value of the first row 310A of the initial demand matrix 138 as the synthetic demand value. Likewise, a synthetic demand value for a second synthetic demand value cell 412B of the first row 410 of the first synthetic demand matrix 140A is assigned by randomly (or pseudo randomly) selecting a demand value of the first row 310A of the initial demand matrix 138 as the synthetic demand value. As illustrated in FIG. 4, the synthetic demand value assigned to the second synthetic demand value cell 412B can be the same as the synthetic demand value assigned to the first synthetic demand value cell 412A. Put another way, during the randomization process 128, the set of demand values from which a synthetic demand value is selected is the same for each synthetic demand value cell of a row. Thus, some demand values from the first row 310A are likely to be represented more than once in the first row 410 of the first synthetic demand matrix 140A. In FIG. 4, the randomization process 128 is repeated to generate a second synthetic demand matrix 140B and an Nth synthetic demand matrix 140C.

As a result of the randomization process 128, some rows of the synthetic demand matrices 140 may have very few (or even no) non-zero demand values. Such rows provide little statistical information. To reduce processing capacity used for such rows, the inventory control system 102 can eliminate these rows from consideration by generating and using the sparse demand matrix 142. The sparse demand matrix 142 includes a plurality of sparse demand vectors 404, including one sparse demand vector 404 for each synthetic demand matrix 140. Each sparse demand vector 404 includes a zero value for each row that satisfies the sparse demand criteria 124 and a one value for each row that does not satisfy the sparse demand criteria 124. In a particular implementation, the sparse demand criteria 124 includes a count threshold and a demand threshold. The count threshold, the demand threshold, or both, can be different for different inventory items, and each is applied on a row-by-row basis.

The demand threshold is a limit of the magnitude of each demand value. Determining the sparse demand vector 404 for a particular synthetic demand matrix 140 includes determining a demand count for each inventory item vector (e.g., each row in the example of FIG. 4) of the particular synthetic demand matrix 140. Each demand value that is greater than or equal to the demand threshold is counted to generate a count 402. For example, in FIG. 4, the synthetic demand value $(DV_{1p})$ in the first synthetic demand value cell 412A is compared to the demand threshold. If the synthetic demand value $(DV_{1p})$ in the first synthetic demand value cell 412A is greater than (or greater than or equal to) the demand threshold, the count 402A corresponding to the first row 410 is incremented. If the synthetic demand value $(DV_{1p})$ in the first synthetic demand value cell 412A is less than (or less than or equal to) the demand threshold, the count 402A corresponding to the first row 410 is not incremented. Likewise, the synthetic demand value $(DV_{1p})$ in the second synthetic demand value cell 412B is compared to the demand threshold and the count 402A for the first row 410 is incremented or not incremented depending on the result of the comparison. Thus, the count for the first row 410 (e.g., "3" in the example illustrated in FIG. 4) indicates how many synthetic demand values in the first row 410 satisfy (e.g., are greater than, or greater than or equal to) the demand threshold. Similar counts 402B, 402C are generated for the other synthetic demand matrices 140B, 140C, respectively.

A sparse demand vector 404 is generated for each synthetic demand matrix 140 by comparing the count value for each inventory item vector (e.g., each row in the example of FIG. 4) to the count threshold. If the count value for an inventory item vector is greater than (or greater than or equal to) the count threshold for the inventory item, a one value is added to the sparse demand vector 404 for the row. If the count value for the inventory item vector is less than (or less than or equal to) the count threshold for the inventory item, a zero value is added to the sparse demand vector 404 for the row. For example, as explained above, the count value for the first row 410 of the first synthetic demand matrix 140A is 3 in the example illustrated in FIG. 4. The count value of 3 is compared to the count threshold for the first inventory item $(I_1)$ corresponding to the first row 410. In the example illustrated in FIG. 4, the count value of 3 satisfies (e.g., is greater than, or greater than or equal to) the count threshold; therefore the sparse demand vector 404A includes a 1 corresponding to the first row 410. However, if the count value of 3 failed to satisfy (e.g., was less than, or less than or equal to) the count threshold, the sparse demand vector 404A would have included a 0 corresponding to the first row 410. Similar sparse demand vectors 404B, 404C are generated for the other synthetic demand matrices 140B, 140C, respectively.

The demand threshold and the count threshold are specified in the inventory control parameters 122. In some implementations, different demand thresholds can be used for different inventory items, different count thresholds can be used for different inventory items, or both. For example, a demand threshold used to determine a count value for the first row 410 can be different than a demand threshold use to determine a count value for a second row 414. Additionally, or in the alternative, a count threshold used to determine a value in the sparse demand vector 404A for the first row 410 can be different than a value in the sparse demand vector 404A for the second row 414.

The sparse demand vectors 404 are arranged in a matrix to form the sparse demand matrix 142. Thus, the sparse demand matrix 142 includes one sparse demand vector 404 per synthetic demand matrix 140, and each sparse demand vector 404 includes one row per inventory item. Accordingly, the sparse demand matrix 142 is an N×I matrix, where N is the number of synthetic demand matrices 140 and I is the number of tracked inventory items.

Figure 5:
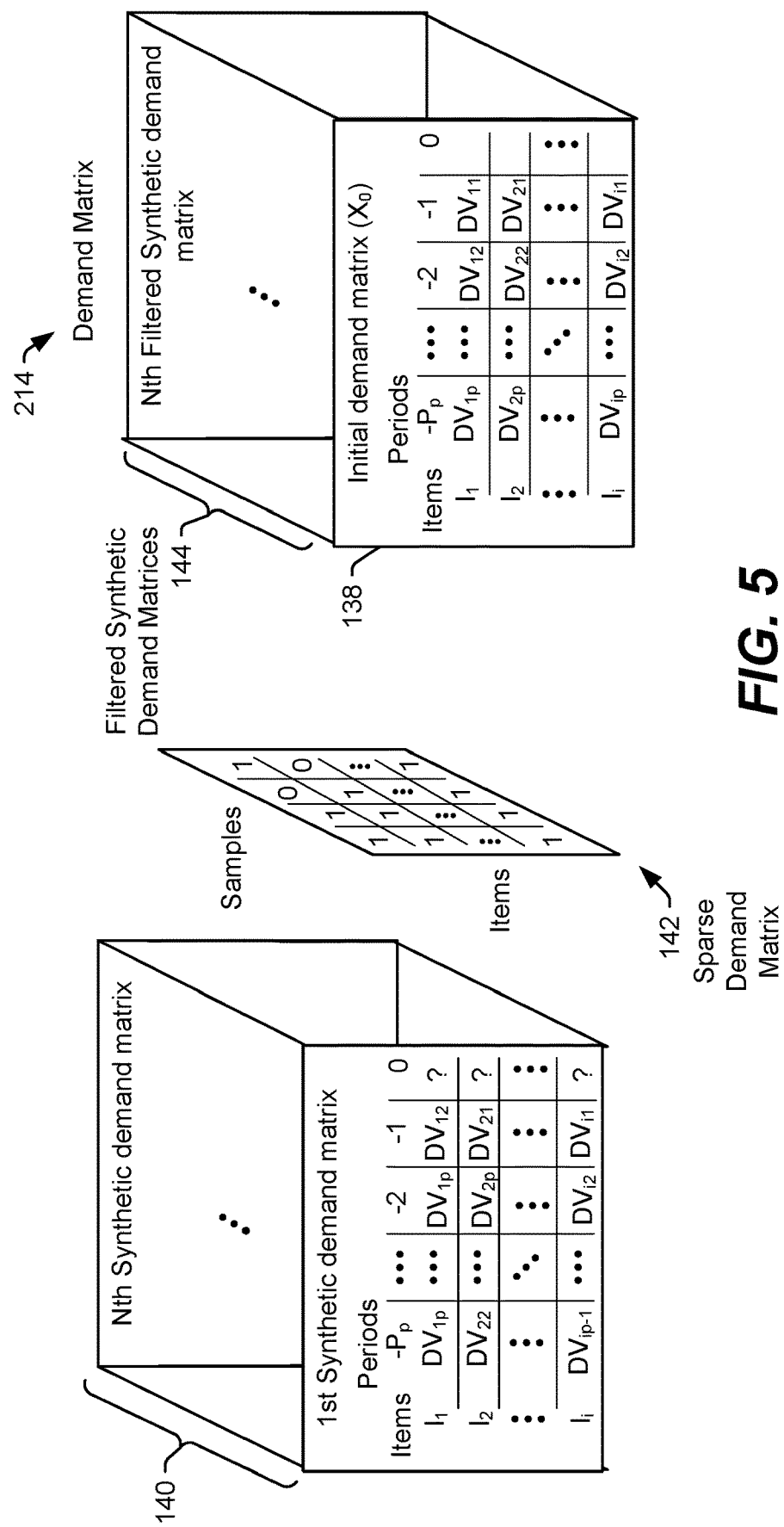
FIG. 5 is a diagram that illustrates a portion of the method of inventory control of FIG. 2 according to a particular implementation.

As illustrated in FIG. 5, the sparse demand matrix 142 is used as a filter matrix to generate the filtered synthetic demand matrices 144. In the particular implementation illustrated in FIG. 5, the filtered synthetic demand matrices 144 are generated by dividing the synthetic demand matrices 140 by the sparse demand matrix 142. As described above, the sparse demand matrix 142 includes only one values and zero values. Division by a one value in the sparse demand matrix 142 returns the value from the synthetic demand matrix 140. Division by a zero value in the sparse demand matrix 142 returns a not-a-number (NaN) value. Thus, each row in the filtered synthetic demand matrices 144 is either identical to the corresponding row in the synthetic demand matrices 140, or is filled with NaN values. The processors 104 ignore the NaN values, therefore the rows of the filtered synthetic demand matrices 144 that have NaN values are ignored in subsequent calculations. Filtering the synthetic demand matrices 140 in this manner is resource efficient (i.e., uses little processing capacity) and results in filtered synthetic demand matrices 144 that are aligned appropriately. For example, each of the filtered synthetic demand matrices 144 has the same number of rows, even though some of the filtered synthetic demand matrices 144 include rows are ignored for subsequent calculations. Thus, no additional processing capacity is required to align or index the rows. Additionally, each of the filtered synthetic demand matrices 144 has the same number of rows as the initial demand matrix 138, which enables grouping the filtered synthetic demand matrices 144 and the initial demand matrix 138 as arrays in the three-dimensional demand matrix 214.

Figure 6:
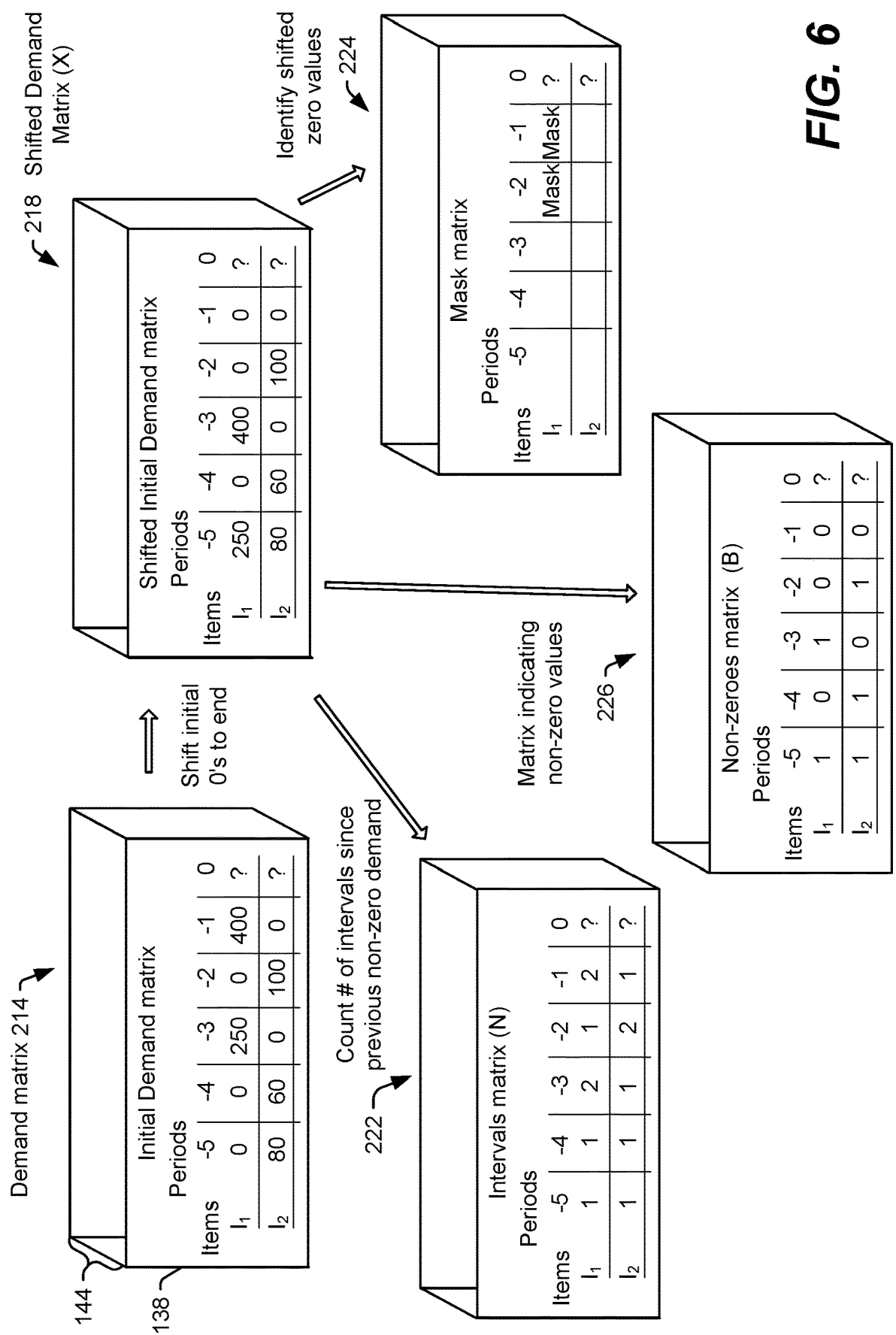
FIG. 6 is a diagram that illustrates a portion of the method of inventory control of FIG. 2 according to a particular implementation.

FIG. 6 illustrates generation of the pre-processing matrices 222-226 and shifting of the demand matrix 214. Additional details regarding shifting the demand matrix 214 are provided with reference to FIG. 7 and additional details regarding forming the intervals matrix 222 are provided with reference to FIG. 8. The simplified example of FIG. 6 illustrates two rows of demand values in the initial demand matrix 138, illustrates results of shifting the demand values to form the shifted demand matrix 218, and illustrates the resulting values in the pre-processing matrices 222-226.

To simplify parallel processing using matrix operations, it is useful if there are no zero values in the first column of each array of the demand matrix 214. Thus, in the example illustrated in FIG. 6, one or more rows of the demand matrix 214 are shifted to form the shifted demand matrix 218. Specifically, in the example illustrated in FIG. 6, a first row (corresponding to inventory item $I_1$) of the initial demand matrix 138 has a zero demand value in the oldest tracked period (Index −5), a zero demand value in the second oldest tracked period (Index −4), and a non-zero demand value in the third oldest tracked period (Index −3). A second row (corresponding to inventory item $I_2$) has a non-zero demand value in the oldest tracked period (Index −5). To generated the shifted demand matrix 218, the first row is shifted to the left by two columns so that the non-zero demand value from the third oldest tracked period (Index −3) of the initial demand matrix 138 is in the oldest tracked period (Index −5) of the shifted demand matrix 218. Zero demand values are added as padding to the newest tracked period (Index −1) and the second newest tracked period (Index −2) so that the first row in the shifted demand matrix 218 has the same number of demand values as the first row of the initial demand matrix 138. Since the second row of the initial demand matrix 138 has a non-zero value in the oldest tracked period (Index −5), the second row is not shifted. Accordingly, the second row of the shifted demand matrix 218 is identical to the second row of the initial demand matrix 138.

The mask matrix 224 has values indicating which demand value cells of the demand matrix have padding values added during shifting of the demand matrix 214. For example, in FIG. 6, the mask matrix 224 includes mask values corresponding to the newest tracked period (Index −1) and the second newest tracked period (Index −2) of the first row in the shifted demand matrix 218.

The non-zeroes matrix 226 has a value of 1 in each cell that corresponds to a demand value cell of the shifted demand matrix 218 that has a non-zero value, and has a value of 0 in each cell that corresponds to a demand value cell of the shifted demand matrix 218 that has a zero value. Thus, in FIG. 6, a cell of the non-zeroes matrix 226 for the first row ($I_1$) and the first column (Index −5) has a 1 indicating that the first row and first column of the shifted demand matrix 218 has a non-zero value (e.g., a value of 250 in FIG. 6). Additionally, in FIG. 6, a cell of the non-zeroes matrix 226 for the first row ($I_1$) and the second column (Index −4) has a 0 indicating that the first row and second column of the shifted demand matrix 218 has a 0 value. Thus, the non-zeroes matrix 226 is similar to Boolean matrix indicating which demand value cells of the shifted demand matrix 218 have non-zero values, except that the non-zeroes matrix 226 stores numeric values rather than logical values.

Each cell of the intervals matrix 222 has a value that indicates how many intervals separate non-zero values of the shifted demand matrix 218. To simplify processing, the oldest tracked period (corresponding to Index −5 in the example of FIG. 6) is assigned a value of 1. This is equivalent to assuming that a period before the earliest demand value was a non-zero value. Each other cell of the intervals matrix 222 is assigned by calculating intervals between non-zeroes demand values. For example, in FIG. 6, the first row ($I_1$) and the first column (Index −5) of the shifted demand matrix 218 has a non-zero value (e.g., 250) resulting in the first row and second column of the intervals matrix 222 having a 1 value (indicating that a non-zero value is in the shifted demand matrix 218 one interval prior to the corresponding cell). Further, the first row ($I_1$) and the second column (Index −4) of the shifted demand matrix 218 has a zero value (e.g., 0) resulting in the first row and third column (Index −3) of the intervals matrix 222 having a 2 value (indicating that the most recent non-zero value in the shifted demand matrix 218 is two intervals prior to the corresponding cell).

FIG. 7 illustrates an example of efficient matrix operations to determine the shifted demand matrix 218 from the demand matrix 214. The operations to determine the shifted demand matrix 218 include determining a non-zeroes matrix 702 for the demand matrix 214. As a reminder, the demand matrix 214 is an I×P×S matrix, and the non-zeroes matrix 702 has one cell for each demand value cell of the demand matrix 214; thus, the non-zeroes matrix 702 is an I×P×S matrix. The non-zeroes matrix 702 for the demand matrix 214 is determined in the same manner as previously described for determining the non-zeroes matrix 226 for the shifted demand matrix 218. For example, each cell of the non-zeroes matrix 702 is assigned a value based on whether the corresponding cell of the demand matrix 214 has a non-zero value. A value of 1 is assigned to the cell of the non-zeroes matrix 702 if the corresponding cell of the demand matrix 214 has a non-zero value, and a value of 0 is assigned to the cell of the non-zeroes matrix 702 if the corresponding cell of the demand matrix 214 has a 0 value.

The operations also include generating an index (IDX) matrix 704 that includes a cell index value in each cell. The IDX matrix 704 includes one cell for each cell of the demand matrix 214; thus, the IDX matrix 704 is an I×P×S matrix. In the example illustrated in FIG. 7, the cell index values in the IDX matrix 704 are assigned from left to right. To illustrate, in FIG. 7, each cell of the first column (Index −10) is assigned a cell index value of 0, each cell of the second column (Index −9) is assigned a cell index value of 1, and so forth.

A $IDX_{start}$ array 706 is determined by identifying the cell index value of the oldest (e.g., further to the left in the example of FIG. 7) non-zero value of each inventory item vector (e.g., row) of the demand matrix 214. The $IDX_{start}$ array 706 has one cell per inventory item per demand array of the demand matrix 214, where a demand array is either the initial demand matrix 138 or one of the synthetic demand matrices 140. Thus, the $IDX_{start}$ array 706 is an I×S array. In FIG. 7, the $IDX_{start}$ array 706 has a 0 in the first row ($I_1$), indicating that the first non-zero value in a demand cell of the first row of the demand matrix 214 corresponds to a cell index value 0 in the IDX matrix 704. Likewise, the $IDX_{start}$ array 706 has a 3 in the second row ($I_2$), indicating that the first non-zero value in a demand cell of the second row of the demand matrix 214 corresponds to a cell index value 3 in the IDX matrix 704.

A new IDX matrix ($IDX_{new}$ matrix 708) is determined by shifting each row of the IDX matrix 704 by a number of cells corresponding to the value for the row in the $IDX_{start}$ array 706. For example, since the first row of the $IDX_{start}$ array 706 has a 0 value in the example of FIG. 7, the first row of the $IDX_{new}$ matrix 708 is shifted 0 places (i.e., is not shifted) relative to the first row of the IDX matrix 704. Since the second row of the $IDX_{start}$ array 706 has a 3 value in the example of FIG. 7, the second row of the $IDX_{new}$ matrix 708 is shifted 3 places to the left relative to the second row of the IDX matrix 704. The $IDX_{new}$ matrix 708 is then used to rearrange (e.g., shift or re-index) the demand matrix 214 to form the shifted demand matrix 218. In a particular implementation, rearranging the demand matrix 214 based on the $IDX_{new}$ matrix 708 is a less resource intensive operation (i.e., uses fewer individual instructions) than using an iterative shift operation to shift each row individually based on the $IDX_{start}$ array 706.

FIG. 8 illustrates an example of efficient matrix operations to determine the intervals matrix 222 based on the non-zeroes matrix 226. The operations include, generating a time matrix 802. The time matrix 802 includes one cell for each demand value cell of the shifted demand matrix 218; thus, the time matrix 802 is an I×P×S matrix. The time matrix 802 is generated in the same manner as the IDX matrix 704 of FIG. 7 except that cells of the column associated with the oldest data are numbered starting with 1 rather than 0. Thus, the first column (Index −10) of the time matrix 802 in the example of FIG. 8 is assigned a value of 1 in each row, the second column (Index −9) is assigned a value of 2 in each row, and so forth.

A matrix 804 is determined by multiplying the non-zeroes matrix 226 and the time matrix 802. The matrix 804 thus includes a value of 0 in each cell that corresponds to a zero value in the non-zeroes matrix 226 and includes a time index value in each cell that corresponds to a non-zero value in the non-zeroes matrix 226.

A running maximum ("max") matrix 806 is determined based on the matrix 804 by filling each data cell, beginning from the left, with the largest value encountered in any prior cell. Thus, the first column for each row of the running max matrix 806 is identical to the first column of the corresponding row of the matrix 804 (because no matter what value is in the first column, it is the largest encountered). The second column of the running max matrix 806 includes either the same value as the corresponding cell of the matrix 804 or the same value as the first column of the row, depending on which is larger. To illustrate, in the example illustrated in FIG. 8, the data cell at the fifth column (Index −6) and first row ($I_1$) of the matrix 804 has a zero value; however, the data cell at the fifth column (Index −6) and first row ($I_1$) of the running max matrix 606 has a value of 3 since the largest value to the left of the fifth column in the first row of the matrix 804 is 3.

A difference matrix 808 is determined based on the running max matrix 806. The difference matrix 808 is an I×(P−1)×S matrix. Each cell in the difference matrix 808 has a value indicating the difference of two adjacent cells starting from the left. For example, the first column (Index −9) of the difference matrix 808 indicates a difference between the first column (Index −10) and the second column (Index −9) of the running max matrix 806. The difference matrix 808 is left padded with one values or zero values to form the left-padded difference matrix 810. The intervals matrix 222 is formed by replacing each zero value in the left-padded difference matrix 810 with a one value.

Figure 9:
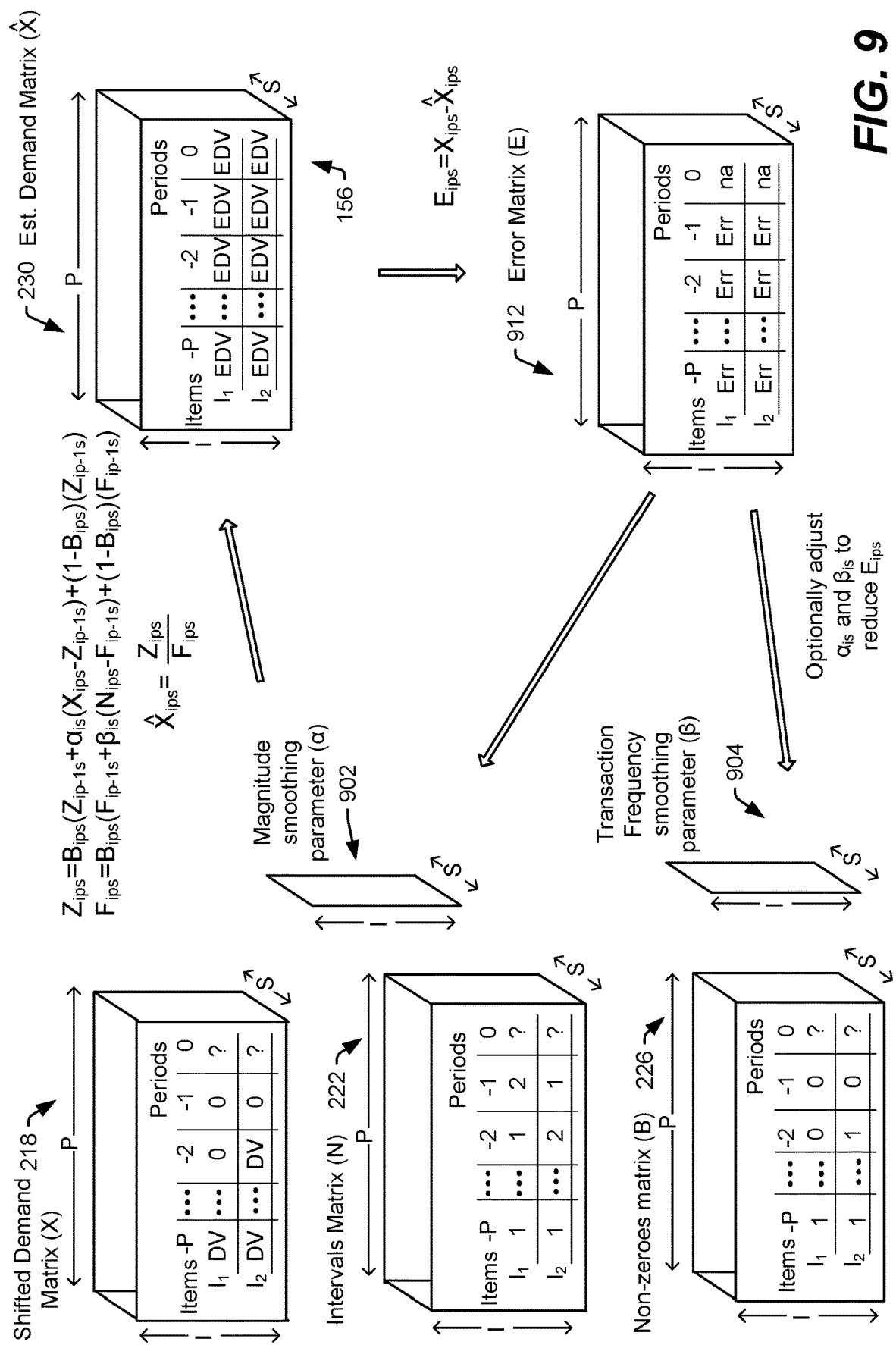
FIG. 9 is a diagram that illustrates a portion of the method of inventory control of FIG. 2 according to a particular implementation.

FIG. 9 is a diagram that illustrates a portion of the method of inventory control of FIG. 2 according to a particular implementation. In particular, FIG. 9 illustrates determining the estimated demand matrix 230 based on the shifted demand matrix 218, the intervals matrix 222 and the non-zeroes matrix 226. FIG. 9 also illustrates determining an error matrix 912, which can be used to tune smoothing parameters used to calculate the estimated demand matrix 230. Determination of the estimated demand matrix 230 is further based on a magnitude smoothing parameter ($\alpha$) array 902 and a transaction frequency smoothing parameter ($\beta$) array 904. The magnitude smoothing parameter array 902 and the transaction frequency smoothing parameter array 904 are each I×S arrays. In a particular implementation, the magnitude smoothing parameter array 902 and the transaction frequency smoothing parameter array 904 are determined using an iterative process. For example, the operations illustrated in FIG. 9 can be performed multiple times, with values in the magnitude smoothing parameter array 902, the transaction frequency smoothing parameter array 904, or both, adjusted (e.g., using a gradient descent process or another optimization process) in each iteration to reduce or minimize error valued in the error matrix 912.

The estimated demand matrix 230 includes a plurality of estimated demand value (EDV) cells (i.e., I×P×S EDV cells). FIG. 9 illustrates equations for calculating the EDVs. Each EDV ($\hat{X}_{ips}$) (i.e., the value of each cell of the estimated demand matrix 230) is a function of a demand magnitude value ($Z_{ips}$) and a demand frequency value ($F_{ips}$). The demand magnitude value ($Z_{ips}$) for a particular inventory item (i) for a particular tracking period (p) and a particular demand array (s) (i.e., a demand magnitude value for the demand value $cell_{ips}$) is calculated based on a non-zeroes value ($B_{ips}$) of a corresponding cell of the non-zeroes matrix 226, a demand value ($X_{ips}$) of a corresponding cell of the shifted demand matrix 218, a magnitude smoothing value ($\alpha_{is}$) of a corresponding cell of the magnitude smoothing parameter array 902, and a demand magnitude value ($Z_{ip-1s}$) of a cell from a prior tracking period (p−1) for the same inventory item (i) and demand array (s). The demand frequency value ($F_{ips}$) for a particular inventory item (i) for a particular tracking period (p) and a particular demand array (s) (i.e., a demand magnitude value for the demand value $cell_{ips}$) is calculated based on a non-zeroes value ($B_{ips}$) of a corresponding cell of the non-zeroes matrix 226, an interval value ($N_{ips}$) of a corresponding cell of the intervals matrix 222, a transaction frequency smoothing value ($\beta_{is}$) of a corresponding cell of the transaction frequency smoothing parameter array 904, and a demand frequency value ($F_{ip-1s}$) of a cell from a prior tracking period (p−1) for the same inventory item (i) and demand array (s). Note that this calculation process enables simultaneous (or parallel) calculation of estimated demand for any number of inventory items (I) and any number of samples (S), thereby enabling more efficient utilization of processing resources, inventory control devices 110, and manufacturing systems 108.

After the EDVs of the estimated demand matrix 230 are calculated, each EDV ($\hat{X}_{ips}$) can be compared to the corresponding demand value ($X_{ips}$) of the shifted demand matrix 218 to determine an error value ($E_{ips}$) of an error matrix 912. The error matrix 912 can be used to determine error bars or other statistical evaluations of error for the estimated demand values. In some implementations, the error matrix 912 can also be used to tune magnitude smoothing values ($\alpha_{is}$) of the magnitude smoothing parameter array 902, to tune transaction frequency smoothing values ($\beta_{is}$) of the transaction frequency smoothing parameter array 904, or both. For example, the magnitude smoothing values ($\alpha_{is}$) and the transaction frequency smoothing values ($\beta_{is}$) can initially by manually set (e.g., based on estimates) or even randomly or pseudo randomly assigned by the processors 104. The operations illustrated in FIG. 9 can be performed to generate the estimated demand matrix 230 and the error matrix 912. The magnitude smoothing values ($\alpha_{is}$) and the transaction frequency smoothing values ($\beta_{is}$) can then be adjusted (e.g. using a gradient descent or binary search algorithm) to attempt to minimize or reduce the error values of the error matrix 912. After adjusting the magnitude smoothing values ($\alpha_{is}$) and the transaction frequency smoothing values ($\beta_{is}$), the same data (e.g., the same shifted demand matrix 218, intervals matrix 222, and non-zeroes matrix 226) can be used to determine an updated version of the estimated demand matrix 230 using the adjusted magnitude smoothing values ($\alpha_{is}$) and the transaction frequency smoothing values ($\beta_{is}$). This process can be repeated iteratively until the error values of the error matrix 912 satisfy a threshold or until improvement (e.g., decrease) of the error values of the error matrix 912 from one iteration to the next satisfies a threshold. Subsequently, the magnitude smoothing values ($\alpha_{is}$) and the transaction frequency smoothing values ($\beta_{is}$) determined using this iterative process can be used for other data (e.g., a different shifted demand matrix 218, intervals matrix 222, and non-zeroes matrix 226). In some implementations, the magnitude smoothing values ($\alpha_{is}$) and the transaction frequency smoothing values ($\beta_{is}$) can be updated or adjusted periodically or occasionally, such as after each new estimated demand matrix 230 is determined or when error values of the error matrix 912 increase to an unsatisfactory level.

Figure 10:
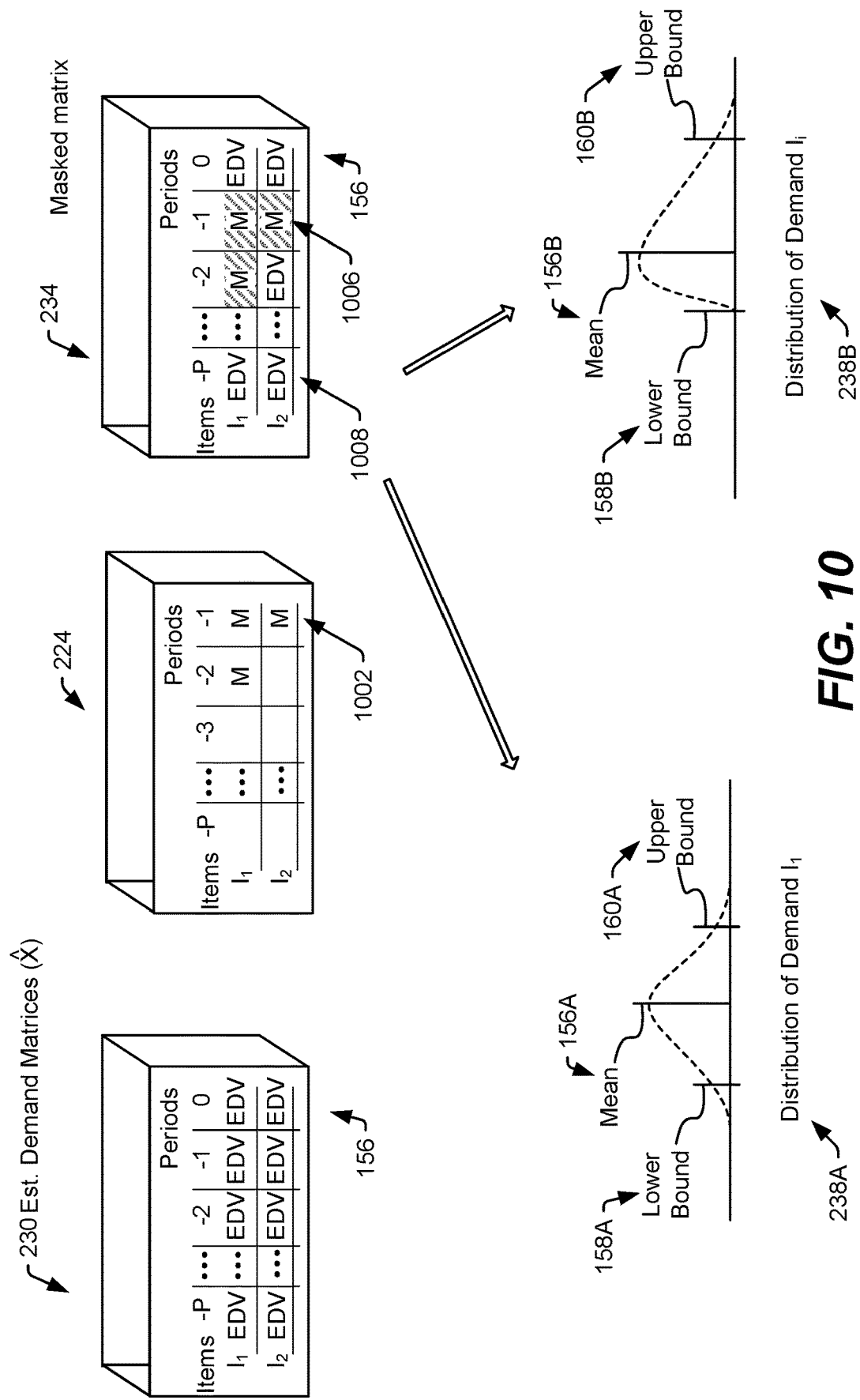
FIG. 10 is a diagram that illustrates a portion of the method of inventory control of FIG. 2 according to a particular implementation.

FIG. 10 illustrates an example of determining the distributions 238 based on the estimated demand matrix 230 and the mask matrix 224. As illustrated in FIG. 10, the mask matrix 224 is applied to the estimated demand matrix 230 to mask particular values. For example, the mask matrix 224 includes one or more mask values 1002 that indicate which demand value cells of the demand matrix 214 were shifted during the shifting operation illustrated in FIGS. 6 and 7. Applying the mask matrix 224 to the estimated demand matrix 230 causes estimated demand value cells of the estimated demand matrix 230 corresponding to mask values 1002 of the mask matrix 224 to be masked (e.g., masked estimated demand value cells 1006) in the masked matrix 234. Unmasked estimated demand value cells 1008 of the masked matrix 234 (including estimated demand values 156 for the target period) are used to determine the distributions 238. Whereas the initial demand matrix 138 included P data points per inventory item, the masked matrix 234 includes P×S data points per inventory items minus the number of masked estimated demand value cells 1006 for each inventory item. Accordingly, the distributions 238 are generated based on more data points than are available in the initial demand matrix 138 alone.

The distributions 238 can be used to determine a range of demand values that is likely to occur, where the range is bounded by the lower bound 158 and the upper bound 160. Different inventory items are expected to have different distributions, such as a first distribution 238A for a first inventory item and an ith distribution 238B for an ith inventory item. The distributions 238A and 238B can have different shapes. Accordingly, different analyses can be used to determine the lower bound 158A and upper bound 160A of the first distribution 238A than are used to determine the lower bound 158B and upper bound 160B of the ith distribution 238B.

Figure 11:
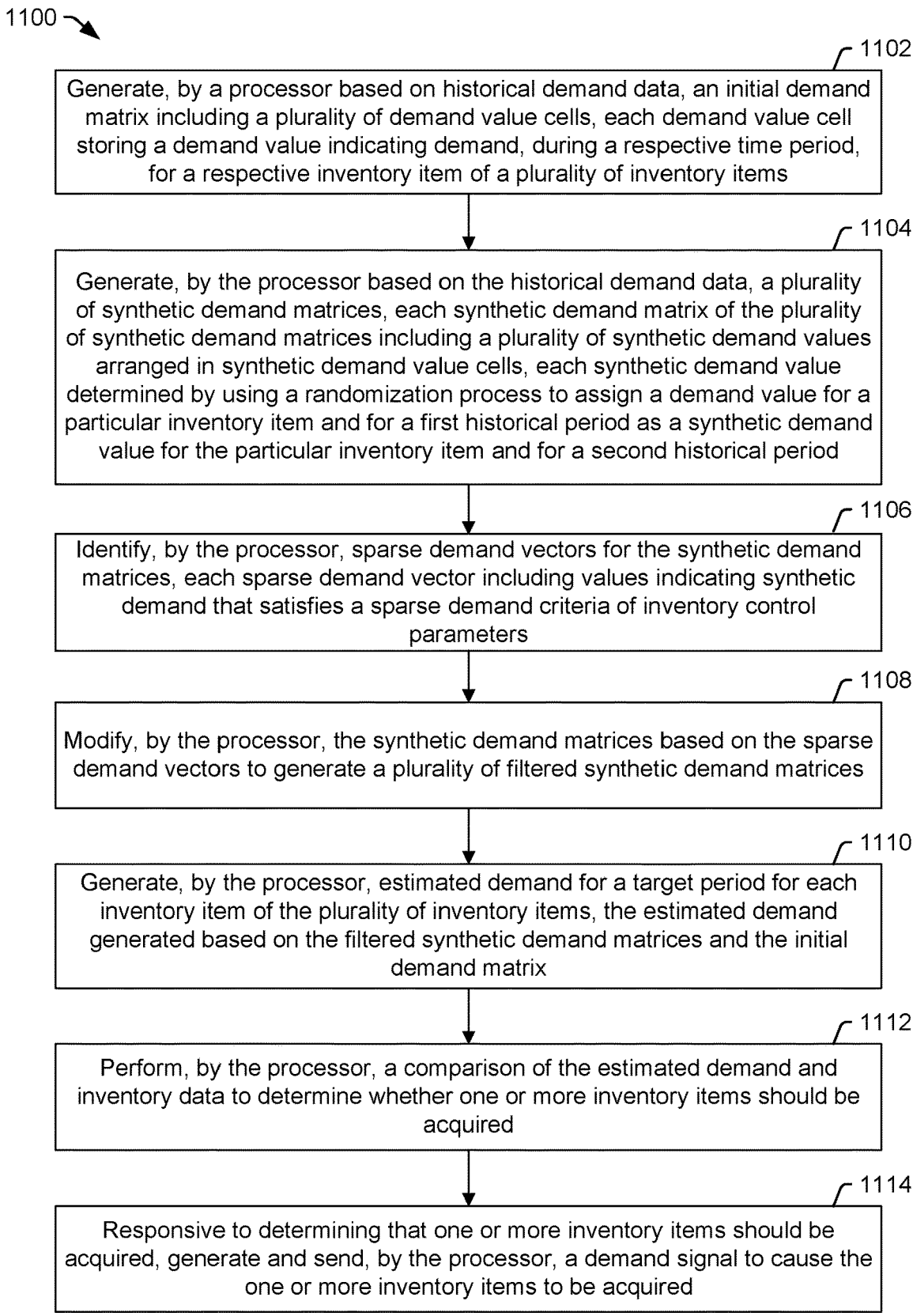
FIG. 11 is a flow chart of an example of a method of inventory control.

FIG. 11 is a flow chart of an example of a method 1100 of inventory control. The method 1100 may be performed by the inventory control system 102, such as by the one or more processors 104 executing the inventory control instructions 126.

The method 1100 includes, at 1102, generating, by a processor based on historical demand data, an initial demand matrix including a plurality of demand value cells. Each demand value cell stores a demand value indicating demand, during a respective time period, for a respective inventory item of a plurality of inventory items. For example, the initial demand matrix 138 can be generated by the processors 104 by aggregating transaction data into time series 204 and converting the time series 204 to a relative time index to align the tracking periods of various inventory items, as described with reference to FIGS. 2 and 3.

The method 1100 also includes, at 1104, generating, by the processor based on the historical demand data (e.g., based on the initial demand matrix 138), a plurality of synthetic demand matrices. Each synthetic demand matrix of the plurality of synthetic demand matrices includes a plurality of synthetic demand values arranged in synthetic demand value cells. Each synthetic demand value is determined by using a randomization process to assign a demand value for a particular inventory item and for a first historical period as a synthetic demand value for the particular inventory item and for a second historical period. For example, the synthetic demand matrices 140 can be generated using the randomization process 128 described with reference to FIGS. 2 and 4.

The method 1100 further includes, at 1106, identifying, by the processor, sparse demand vectors for the synthetic demand matrices. Each sparse demand vector represents synthetic demand that satisfies a sparse demand criteria of inventory control parameters. For example, the sparse demand vectors 404 can be determined for the synthetic demand matrices 140 by comparing demand values of the synthetic demand matrices 140 to the sparse demand criteria 124. To illustrate, each synthetic demand value of each inventory item vector of each synthetic demand matrix 140 can be compared to a demand threshold, as described with reference to FIG. 4. In this example, each synthetic demand value that satisfies (e.g., is greater than, or greater than or equal to) the demand threshold is counted and a total count for each inventory item is compared to a count threshold. If the count for a particular inventory item vector satisfies the count threshold, a value of 1 is added to the sparse demand vector 404 for the particular inventory item vector. The sparse demand vectors 404 can be assembled in an array to form the sparse demand matrix 142.

The method 1100 also includes, at 1108, modifying, by the processor, the synthetic demand matrices based on the sparse demand vectors to generate a plurality of filtered synthetic demand matrices. For example, as described with reference to FIGS. 2 and 5, the synthetic demand matrices 140 can be divided by the sparse demand matrix 142 (which includes the sparse demand vectors 404) to form the filtered synthetic demand matrices 144.

The method 1100 further includes, at 1110, generating, by the processor, estimated demand for a target period for each inventory item of the plurality of inventory items. The estimated demand is generated based on the filtered synthetic demand matrices and the initial demand matrix. For example, as described with reference to FIGS. 2 and 9, a shifted demand matrix 218 which includes shifted versions of filtered synthetic demand matrices 144 and the initial demand matrix 138 can be used to determine the estimated demand matrix 230, which includes estimated demand values 156 for a target period for a plurality of inventory items.

The method 1100 also includes, at 1112, performing, by the processor, a comparison of the estimated demand and inventory data to determine whether one or more inventory items should be acquired. For example, as described with reference to FIGS. 1 and 2, the estimated demand 150, which can include the estimated demand values 156, lower bounds 158, upper bounds 160, or a combination thereof, is compared to the inventory data 120 to identify inventory items that should be acquired (e.g., moved, purchased, or manufactured).

In some implementations, the method 1100 also includes generating, by the processor, a demand distribution for each inventory item of the plurality of inventory items and determining, based on the demand distribution for each inventory item of the plurality of inventory items, an upper demand bound, a lower demand bound, or both, for each inventory item of the plurality of inventory items. The method 1100 can also include determining, by the processor, whether a count of instances for a particular inventory item and a particular location is within a range of demand indicated by the upper demand bound and the lower demand bound of the particular inventory item and the particular location, where the processor sends the demand signal based on determining that the count of instances is not within the range of demand.

The method 1100 further includes, at 1114, responsive to determining that one or more inventory items should be acquired, generating and sending, by the processor, a demand signal to cause the one or more inventory items to be acquired. For example, as described with reference to FIG. 1, the inventory control system 102 can generate and send the demand signals 112 to one or more manufacturing systems 108 to cause a particular inventory item 114 to be manufactured. Alternatively, or in addition, the inventory control system 102 can generate and send the demand signals 112 to one or more inventory control devices 110 to cause a particular inventory item 114 to be relocated.

Figure 12:
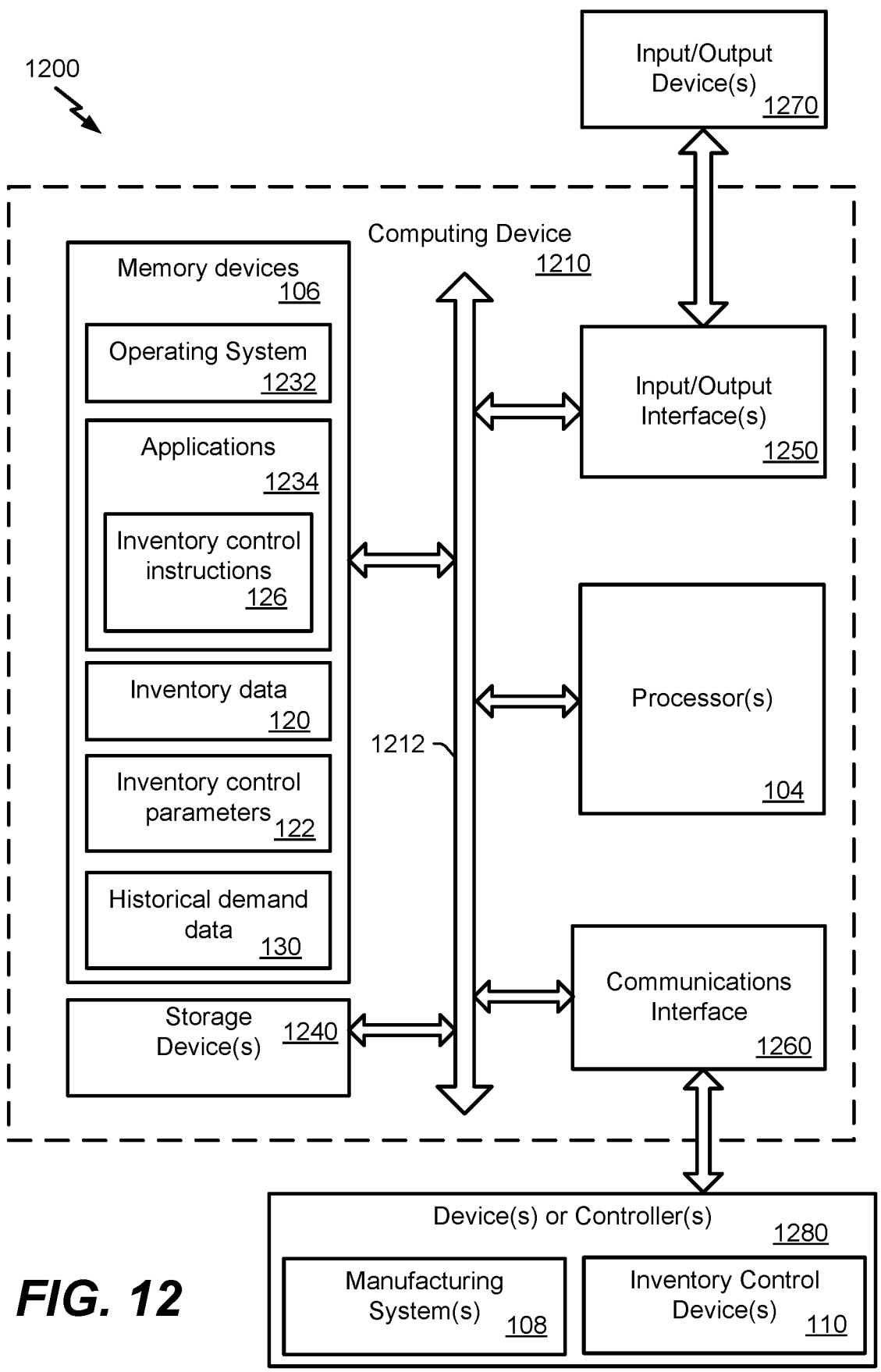
FIG. 12 is a block diagram illustrating aspects of an example of a computing system configured to perform inventory control operations.

FIG. 12 is a block diagram illustrating aspects of an example of a computing system configured to perform inventory control operations. FIG. 12 illustrates a computing environment 1200 including a computing device 1210 configured to support embodiments of computer-implemented methods and computer-executable program instructions (or code) according to the present disclosure. For example, the computing device 1210, or portions thereof, may execute instructions to initiate, perform, or control inventory control operations of an inventory control system 102. To illustrate, the computing device 1210, or portions thereof, may execute the inventory control instructions 126 to perform the inventory control operations. The computing device 1210, or portions thereof, may further execute instructions to perform any of the operations or methods described herein, such as the operations and/or method described with reference to FIGS. 2-11.

The computing device 1210 includes the one or more processors 104. The processors 104 communicate with the memory devices 106 (e.g., a system memory), one or more storage devices 1240, one or more input/output interfaces 1250, one or more communications interfaces 1260, or a combination thereof, via a bus 1212. Additionally, or in the alternative, one or more of the memory devices 106 can include a remote storage device (e.g., a data repository) in which case the processors 104 can communicate with the one or more remote memory devices 106 via the communications interface 1260 or another network interface.

The memory devices 106 include volatile memory devices (e.g., random access memory (RAM) devices), nonvolatile memory devices (e.g., read-only memory (ROM) devices, programmable read-only memory, and flash memory), or both. The memory devices 106 can include an operating system 1232, which includes a basic input/output system for booting the computing device 1210 as well as a full operating system to enable the computing device 1210 to interact with users, other programs, and other devices. The memory devices 106 can also include one or more applications 1234 that are executable by the processors 104. For example, the one or more applications 1234 can include the inventory control instructions 126 that are executable by the processors 104 to perform the inventory control operations described herein. The memory devices 106 can also store the inventory data 120, the inventory control parameters 122, and the historical demand data 130.

The processors 104 may also communicate with one or more storage devices 1240. For example, the one or more storage devices 1240 may include nonvolatile storage devices, such as magnetic disks, optical disks, or flash memory devices. The storage devices 1240 may include both removable and non-removable memory devices. The storage devices 1240 may be configured to store an operating system, images of operating systems, applications, and program data. In a particular example, the memory devices 106, the storage devices 1240, or both, include tangible computer-readable media.

The processors 104 communicate with one or more input/output devices 1270 via the one or more input/output interfaces 1250 to facilitate user interaction. The input/output interfaces 1250 can include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1270 can include keyboards, pointing devices, displays, speakers, microphones, touch screens, and other devices. The processors 104 can detect interaction events based on user input received via the input/output interfaces 1250. Additionally, the processors 104 can send a display to a display device via the input/output interfaces 1250.

The processors 104 can communicate with (or send signals to) one or more devices 1280, such as the manufacturing systems 108 or the inventory control devices 110, via the communications interface 1260. The communications interface 1260 can include one or more wired interfaces (e.g., Ethernet interfaces), one or more wireless interfaces that comply with an IEEE 802.11 communication protocol, other wireless interfaces, optical interfaces, or other network interfaces. The one or more devices 1280 can also include host computers, servers, workstations, and other computing devices.

In conjunction with the described examples, the memory devices 106 can include a computer readable storage device storing instructions that are executable by a processor (e.g., the one or more processors 104) to cause the processor to perform inventory control operations. The inventory control operations can include generating, based on the historical demand data 130, an initial demand matrix including a plurality of demand value cells, where each demand value cell stores a demand value indicating demand, during a respective time period, for a respective inventory item of a plurality of inventory items. The inventory control operations can also include generating, based on the historical demand data, a plurality of synthetic demand matrices, where each synthetic demand matrix of the plurality of synthetic demand matrices includes a plurality of synthetic demand values arranged in synthetic demand value cells, and each synthetic demand value is determined by using a randomization process to assign a demand value for a particular inventory item and for a first historical period as a synthetic demand value for the particular inventory item and for a second historical period. The inventory control operations can further include identifying sparse demand vectors for the synthetic demand matrices, where each sparse demand vector includes values indicating synthetic demand that satisfies a sparse demand criteria of inventory control parameters 122. The inventory control operations can also include modifying the synthetic demand matrices based on the sparse demand vectors to generate a plurality of filtered synthetic demand matrices. The inventory control operations can further include generating estimated demand for a target period for each inventory item of the plurality of inventory items, where the estimated demand is generated based on the filtered synthetic demand matrices and the initial demand matrix. The inventory control operations can also include performing a comparison of the estimated demand and the inventory data 120 to determine whether one or more inventory items should be acquired and, responsive to determining that one or more inventory items should be acquired, generating and sending a demand signal to cause the one or more inventory items to be acquired.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An inventory control system comprising:
one or more memory devices storing inventory data, inventory control instructions, inventory control parameters, and historical demand data, the historical demand data indicating demand for each of a plurality of inventory items during a plurality of time periods; and
a processor configured to execute the inventory control instructions, wherein the inventory control instructions, when executed by the processor cause the processor to perform operations comprising:
generating, based on the historical demand data, an initial demand matrix including a plurality of demand value cells, each demand value cell storing a demand value indicating demand, during a respective time period, for a respective inventory item of the plurality of inventory items;
generating, based on the historical demand data, a plurality of synthetic demand matrices, each synthetic demand matrix of the plurality of synthetic demand matrices including a plurality of synthetic demand values arranged in synthetic demand value cells, each synthetic demand value determined by using a randomization process to assign a demand value for a particular inventory item and for a first historical period as a synthetic demand value for the particular inventory item and for a second historical period;
identifying sparse demand vectors for the synthetic demand matrices, each sparse demand vector including values indicating synthetic demand that satisfies a sparse demand criteria of the inventory control parameters;
modifying the synthetic demand matrices based on sparse demand vectors to generate a plurality of filtered synthetic demand matrices;
generating estimated demand for a target period for each inventory item of the plurality of inventory items, the estimated demand generated based on the filtered synthetic demand matrices and the initial demand matrix;
performing a comparison of the estimated demand and the inventory data to determine whether one or more inventory items should be acquired; and
responsive to determining that one or more inventory items should be acquired, generating and sending a demand signal to cause the one or more inventory items to be acquired.

2. The inventory control system of claim 1, wherein the demand signal is sent to a manufacturing system to cause the one or more inventory items to be manufactured.

3. The inventory control system of claim 1, wherein the demand signal is sent to an inventory control device to cause the one or more inventory items to be relocated from a first location to a second location.

4. The inventory control system of claim 1, wherein the historical demand data identifies a plurality of historical transactions, and wherein generating the initial demand matrix comprises:
aggregating transactions of the plurality of historical transactions by inventory item and historical period to generate time series demand data for each inventory item; and
storing respective demand values, based on the time series demand data, in corresponding demand value cells.

5. The inventory control system of claim 4, wherein first time series demand data represents demand for a first inventory item for each of a first set of time periods, wherein second time series demand data represents demand for a second inventory item for each of a second set of time periods, wherein the first set of time periods have a first time interval spacing, and wherein the second set of time periods have a second time interval spacing that is different from the first time interval spacing.

6. The inventory control system of claim 1, wherein identifying the sparse demand vectors comprises:
determining a demand count for each inventory item vector of each synthetic demand matrix;
comparing the demand count for each inventory item vector to a count threshold of the inventory control parameters; and wherein modifying the synthetic demand matrices based on sparse demand vectors includes:

generating a filter matrix, the filter matrix including a zero for each item vector of each synthetic demand matrix having a demand count that fails to satisfy the count threshold and the filter matrix including a one for each item vector of each synthetic demand matrix having a demand count that satisfies the count threshold; and dividing the synthetic demand matrices by the filter matrix to generate the filtered synthetic demand matrices.

7. The inventory control system of claim 6, wherein the sparse demand criteria includes the count threshold and a demand threshold, and wherein the demand count for a particular inventory item vector indicates a number of synthetic demand values in the particular inventory item vector that satisfy the demand threshold.

8. The inventory control system of claim 1, wherein generating the estimated demand for the target period for each inventory item of the plurality of inventory items comprises generating, based on the filtered synthetic demand matrices and the initial demand matrix, an estimated demand matrix, the estimated demand matrix including an estimated demand value for each inventory item of the plurality of inventory items for each historical period and for the target period.

9. The inventory control system of claim 8, wherein the operations further comprise:

generating, based on the estimated demand matrix, a demand distribution for each inventory item of the plurality of inventory items; and determining, based on the demand distribution for each inventory item of the plurality of inventory items, at least one upper demand bound and at least one lower demand bound for each inventory item of the plurality of inventory items.

10. The inventory control system of claim 9, wherein the inventory data indicates a count of instances of each inventory item at each of a plurality of geographically separated locations, wherein an upper demand bound and a lower demand bound is determined for each location of the plurality of geographically separated locations for each inventory item, and wherein performing the comparison of the estimated demand and the inventory data includes:

determining whether a count of instances for a particular inventory item and a particular location is within a range of demand indicated by the upper demand bound and the lower demand bound of the particular inventory item and the particular location, wherein the demand signal is sent based on determining that the count of instances is not within the range of demand.

11. The inventory control system of claim 9, wherein the operations further comprise, before generating the estimated demand matrix:

shifting one or more inventory item vectors of the filtered synthetic demand matrices and the initial demand matrix such that each of the one or more inventory item vectors has a non-zero demand value for an earliest time period;

generating a mask matrix identifying filler demand values added during the shifting of the one or more inventory item vectors; and using the mask matrix to mask from the estimated demand matrix each filler demand value to generate a masked estimated demand matrix, wherein the masked estimated demand matrix is used to generate the demand distribution for each inventory item of the plurality of inventory items.

12. The inventory control system of claim 8, wherein generating the estimated demand matrix comprises, in parallel for multiple inventory items of the plurality of inventory items, calculating the estimated demand value for each inventory item of the plurality of inventory items for each historical period and for the target period based on a magnitude smoothing factor, a transaction frequency smoothing parameter, each non-zero demand value of the filtered synthetic demand matrices, and each non-zero demand value of the initial demand matrix.

13. A computer readable storage device storing instructions that are executable by a processor to cause the processor to perform inventory control operations comprising:

generating, based on historical demand data, an initial demand matrix including a plurality of demand value cells, each demand value cell storing a demand value indicating demand, during a respective time period, for a respective inventory item of a plurality of inventory items;

generating, based on the historical demand data, a plurality of synthetic demand matrices, each synthetic demand matrix of the plurality of synthetic demand matrices including a plurality of synthetic demand values arranged in synthetic demand value cells, each synthetic demand value determined by using a randomization process to assign a demand value for a particular inventory item and for a first historical period as a synthetic demand value for the particular inventory item and for a second historical period;

identifying sparse demand vectors for the synthetic demand matrices, each sparse demand vector including values indicating synthetic demand that satisfies a sparse demand criteria of inventory control parameters;

modifying the synthetic demand matrices based on sparse demand vectors to generate a plurality of filtered synthetic demand matrices;

generating estimated demand for a target period for each inventory item of the plurality of inventory items, the estimated demand generated based on the filtered synthetic demand matrices and the initial demand matrix;

performing a comparison of the estimated demand and inventory data to determine whether one or more inventory items should be acquired; and responsive to determining that one or more inventory items should be acquired, generating and sending a demand signal to cause the one or more inventory items to be acquired.

14. The computer readable storage device of claim 13, wherein the demand signal is sent to a manufacturing system to cause the one or more inventory items to be manufactured.

15. The computer readable storage device of claim 13, wherein the demand signal is sent to an inventory control device to cause the one or more inventory items to be relocated from a first location to a second location.

16. The computer readable storage device of claim 13, wherein the inventory control operations further comprise:

generating a demand distribution for each inventory item of the plurality of inventory items;

determining, based on the demand distribution for each inventory item of the plurality of inventory items, at least one upper demand bound and at least one lower demand bound for each inventory item of the plurality of inventory items; and determining whether a count of instances for a particular inventory item and a particular location is within a range of demand indicated by the upper demand bound and the lower demand bound of the particular inventory item and the particular location, wherein the demand signal is sent based on determining that the count of instances is not within the range of demand.

17. A computer-implemented method of inventory control, the method comprising:

generating, by a processor based on historical demand data, an initial demand matrix including a plurality of demand value cells, each demand value cell storing a demand value indicating demand, during a respective time period, for a respective inventory item of a plurality of inventory items;

generating, by the processor based on the historical demand data, a plurality of synthetic demand matrices, each synthetic demand matrix of the plurality of synthetic demand matrices including a plurality of synthetic demand values arranged in synthetic demand value cells, each synthetic demand value determined by using a randomization process to assign a demand value for a particular inventory item and for a first historical period as a synthetic demand value for the particular inventory item and for a second historical period;

identifying sparse demand vectors for the synthetic demand matrices, each sparse demand vector including values indicating synthetic demand that satisfies a sparse demand criteria of inventory control parameters;

modifying the synthetic demand matrices based on sparse demand vectors to generate a plurality of filtered synthetic demand matrices;

generating, by the processor, estimated demand for a target period for each inventory item of the plurality of inventory items, the estimated demand generated based on the filtered synthetic demand matrices and the initial demand matrix;

performing, by the processor, a comparison of the estimated demand and inventory data to determine whether one or more inventory items should be acquired; and responsive to determining that one or more inventory items should be acquired, generating and sending, by the processor, a demand signal to cause the one or more inventory items to be acquired.

18. The computer-implemented method of claim 17, wherein the processor sends the demand signal to a manufacturing system to cause the one or more inventory items to be manufactured.

19. The computer-implemented method of claim 17, wherein the processor sends the demand signal to an inventory control device to cause the one or more inventory items to be relocated from a first location to a second location.

20. The computer-implemented method of claim 17, further comprising:

generating, by the processor, a demand distribution for each inventory item of the plurality of inventory items;

determining, by the processor based on the demand distribution for each inventory item of the plurality of inventory items, at least one upper demand bound and at least one lower demand bound for each inventory item of the plurality of inventory items; and determining, by the processor, whether a count of instances for a particular inventory item and a particular location is within a range of demand indicated by the upper demand bound and the lower demand bound of the particular inventory item and the particular location, wherein the processor sends the demand signal based on determining that the count of instances is not within the range of demand.

\* \* \* \* \*